United States Patent [19]
Baba

[11] Patent Number: 5,875,162
[45] Date of Patent: Feb. 23, 1999

[54] OPTICAL INFORMATION RECORDING AND/OR REPRODUCING APPARATUS IMPROVED IN SERVO CHARACTERISTICS

[75] Inventor: Hisatoshi Baba, Yokohama, Japan

[73] Assignee: Canon Kabushiki Kaisha, Tokyo, Japan

[21] Appl. No.: 614,891

[22] Filed: Mar. 13, 1996

[30] Foreign Application Priority Data

Mar. 15, 1995 [JP] Japan ................................. 7-056000

[51] Int. Cl.$^6$ ........................................................ G11B 7/09
[52] U.S. Cl. ................................. 369/44.35; 369/44.29
[58] Field of Search ........................... 369/44.29, 44.35, 369/44.36, 44.32, 44.28, 44.39

[56] References Cited

U.S. PATENT DOCUMENTS

| | | | |
|---|---|---|---|
| 4,858,214 | 8/1989 | Baba | 369/32 |
| 4,955,011 | 9/1990 | Baba | 369/54 |
| 5,063,549 | 11/1991 | Yamamura | 369/44.29 |
| 5,090,001 | 2/1992 | Ito et al. | 369/44.29 |
| 5,268,888 | 12/1993 | Terada | 369/44.35 |
| 5,377,096 | 12/1994 | Ono | 369/44.29 |
| 5,416,756 | 5/1995 | Takeshita et al. | 369/44.35 |
| 5,452,275 | 9/1995 | Ogawa | 369/44.35 |

FOREIGN PATENT DOCUMENTS

| | | | |
|---|---|---|---|
| 0214443 | 9/1991 | Japan | 369/44.35 |
| 5298724 | 11/1993 | Japan. | |

*Primary Examiner*—Thang V. Tran
*Attorney, Agent, or Firm*—Fitzpatrick, Cella, Harper & Scinto

[57] ABSTRACT

An optical information recording and/or reproducing apparatus, for performing at least one of recording and reproduction of information as irradiating a recording medium with a light beam, includes an actuator for moving the light beam relative to the medium, a position detecting circuit for detecting a position of the actuator, a circuit for generating a relative position error signal of the light beam to the medium, a control loop for controlling the actuator in accordance with the relative position error signal, a filter for differentiating an output from the position detecting circuit, and an adder for adding an output from the filter to a signal in the control loop. Another optical information recording and/or reproducing apparatus includes an actuator for moving the light beam relative to the medium in a direction traversing the tracks of the medium, a velocity detecting circuit for detecting a velocity of the actuator and outputting a real velocity signal, a circuit for generating a target moving velocity of the light beam, a control loop for controlling the velocity of the actuator, based on the real velocity signal and target velocity signal, a filter for differentiating the real velocity signal, and an adder for adding an output from the filter to a signal in the control loop.

4 Claims, 20 Drawing Sheets

OPTICAL INFORMATION RECORDING AND/OR REPRODUCING APPARATUS IMPROVED IN SERVO CHARACTERISTICS

BACKGROUND OF THE INVENTION

1. Field of the Invention

The present invention relates to a servo system in optical information recording and/or reproducing apparatus (the term "information recording and/or reproducing apparatus" used herein includes all apparatus that perform at least one of recording and reproduction of information), and more particularly, to the optical information recording and/or reproducing apparatus having a stabilized loop for reducing the effect of high-frequency secondary resonance of an actuator.

2. Related Background Art

In the optical information recording and/or reproducing apparatus that are conventionally available, that is, in the information recording and/or reproducing apparatus of an optical disk, a light beam for recording or reproducing information irradiates the optical disk in the form of a fine spot through an objective lens. An information track or information tracks are formed in a spiral shape or in a concentric shape on the optical disk, and information is sequentially read or written during rotating of the optical disk. The rotation of the optical disk causes surface deviation of the optical disk at a point irradiated by the light spot, and the deviation between the rotational axis and the information track causes track deflection. At this time focus control is carried out to move the objective lens along the optical axis in order to focus the fine spot on the disk information surface. Further, tracking control is also carried out to move the objective lens in the track-traversing direction so as to keep the fine spot continuously to follow up the information track.

FIG. 1 shows a block diagram of this focus servo system and tracking servo system. In FIG. 1, reference numeral 1 designates a target value of the servo system, which is a target position in the focusing direction of the disk information surface in the case of the focusing servo or a target position in the tracking direction of the information track in the case of the tracking servo. Numeral 2 represents a feedback point, from which the difference between the target value 1 and an actual position of the light spot is output as an error signal. In a practical apparatus, this error signal is obtained from an output from a servo sensor, and, in this case, it is a negative feedback point comprising a negative feedback circuit. Numeral 3 is an open-loop gain, where an open-loop transfer gain of the servo loop is collectively set. Numeral 4 denotes a phase compensation block, in which compensation is effected in order to stabilize the servo loop. Specifically, it is the phase compensation block for phase lag compensation in the low frequency region, phase lead compensation in the high frequency region, etc. A torque constant represented by numeral 5 and an actuator represented by numeral 6 comprise a drive torque of the actuator for actually moving the light spot in the focusing or tracking direction, and the actuator.

When a loop of the focusing servo system is set in this manner, the loop operates to stabilize the servo system from the sensor to the focusing actuator so that the characteristic S-shaped curve, for example produced from the difference between cross sensor elements in a quarterly divided focusing sensor, may become zero, whereby the position of the objective in the optical-axis direction is always maintained at the optimum spot point. Similarly, when a loop is set by switching the tracking servo system on, the operation for always continuing following up a predetermined track is carried out by forming a negative feedback loop to the tracking actuator in accordance with an output from the tracking sensor.

Further, the optical disk apparatus has a seek function to greatly move the light spot in the radial direction of the disk in order to permit random access to information. Normally, this function, called a seek for jumping to a track at a remote point, is realized by control for moving the objective lens or the optical head at a high speed by a voice coil type linear motor.

A block diagram of this seek velocity control system is shown in FIG. 2. In the drawing, numeral 35 denotes a target track position, which is an input of data indicating a position of an information track desired to be accessed. Numeral 36 is a residual error calculating block, which subtracts the track position where the light spot is located at present from the target track position 35 and then outputs a remaining distance for access. Numeral 34 represents a target velocity generation block, which outputs a target value for the moving velocity of the light spot according to the remaining distance. Generally, the linear motor for seeking is driven at the drive velocity in a drive profile formed like a parabolic drive, a trapezoid drive, or a triangular drive. Normally, the target velocity follows a profile in which the velocity decreases as the optical head approaches a designated track. The target velocity value 21 generated by the target velocity generation block 34 is input into a feedback point 22. The velocity of the light spot, that is, the velocity of the actuator or linear motor 26 is negatively fed back to the feedback point 22. Thus, an output from the feedback point 22 is a velocity deviation between the target velocity and the actual moving velocity of the light spot.

Further, numeral 23 stands for an open-loop gain of the negative feedback loop from the actuator velocity, which is a block for determining the open-loop gain of the velocity servo loop. Numeral 25 is a torque constant of the actuator or a linear motor, which indicates the sensitivity of the actuator. Numeral 26 designates the actuator or linear motor for moving the light spot, which is a tracking actuator in the case of the apparatus of a single actuator and in the track jump operation during seeking to a near distance. It is a linear motor in the case of the apparatus having a linear motor for moving the optical head.

In the above arrangement, the track jump is carried out as follows: the position of the actuator is detected according to the operation of the actuator or linear motor 26; the residual distance calculating block 36 calculates the difference between the position of the actuator and a component of the target track position; the target velocity generation circuit 34 obtains a target velocity value of the actuator 26 according to the difference component; the feedback point block 22 obtains the difference component between the target velocity value and the current moving velocity 32 of the actuator 26; the difference component is amplified with the gain designated by the open-loop gain block 23 of the negative feedback loop to be converted into the torque constant 25; and the actuator 26 is driven by a torque corresponding to the torque constant thus obtained. In this manner, the track jump of the optical pickup head is carried out to the target track, whereby the optical head reaches the target track through a process of rough seeking and subsequent fine seeking in the case of a two-step seek operation or in the same manner as the track jump mode in the case of a onestep seek operation, and then transferring the device into a tracking servo state.

The above conventional examples, however, exhibit various barriers preventing them from meeting recent demands to improve the performance of optical disk apparatus. In order to increase the information capacity of an optical disk, the information area can be decreased by forming a finer spot using a laser light source of a shorter wavelength. In this case, the pitch of information tracks can be decreased, but the accuracy of tracking control must be enhanced with a decrease of the pitch. Since the depth of focus of the spot becomes shallower, the accuracy of similar focus control must be enhanced.

With an improvement in performance of computers, an increased quantity of data are handed, and enormous volumes of data can be processed within a short time. Under such circumstances, data processing amounts, that is, the transfer rate of the optical disk is also desired to be improved. One way for raising the transfer rate is to increase the rpm of the disk. An increase of the rpm of the disk increases the surface deviation and the acceleration of track deflection, which results in the need to enhance the ability of focusing control and tracking control.

Similarly, the ability to seek control needs to be enhanced in order to raise the access velocity to information.

In conventional apparatus, the control ability of focusing servo was limited by the occurrence of high-frequency secondary resonance of the focusing actuator due to deflection, chattering, or disturbance resulting from low rigidity of the actuator system. FIG. 3 shows Bode diagrams of open-loop transfer characteristics of the closed loop of the conventional focusing control. As shown in the diagrams, the primary resonance frequency appears near 30 Hz and the secondary resonance frequency near 10 kHz, and the phase characteristics show rapid changes at the respective points. Here, if the secondary resonance appears at 10 kHz, as illustrated, because of the structure of the actuator, the loop becomes unstable even if the focus control band is about 3 kHz. Namely, in the case of the focusing servo system as in this example, the control band needs to be set below 3 kHz.

A method for decreasing the negative effect of the secondary resonance is to use a band-attenuation filter, called a notch filter, in the servo loop. The method using the notch filter, however, needs to employ a large Q value of the notch filter in order to decrease the phase shift around the control band so as to secure the stability of the loop. This narrows the frequency range that could be attenuated, and the frequency of the notch filter needs to be accurately coincident with the secondary resonance frequency of the actuator. Since the secondary resonance frequency and characteristics change depending upon the ambient temperature or change with age, the effect of the notch filter cannot be fully attained. Further, because the secondary resonance frequency or characteristics changes apparatus-by-apparatus, adjustment was necessary for every apparatus.

Further, the above method using the notch filter just lowered the peak of secondary resonance in the gain characteristics, but did not improve the phase characteristics. Thus, it was not able to be applied to the secondary resonance near the control band, i.e., near the zero-cross frequency.

The situation is the same as to the tracking control loop. Recent tracking actuators, for example as seen in Japanese Patent Application Laid-open No. 5-298724, tend to employ a method for performing seek and tracking over the entire surface of the disk with a single actuator. This method with a single actuator can decrease the number of actuators in the apparatus, and, therefore, can realize a low-cost apparatus as decreasing the dissipation power or decreasing the mechanical and control systems associated with drive and control. It is, however, difficult to decrease the secondary resonance or to increase the secondary resonance frequency because of the mechanism. It was thus difficult to enhance control accuracy when the actuator of this type was used.

The same problem arises as to seek control. As discussed above and shown in the block diagram of the seek velocity control system in FIG. 2, the seek operation is carried out under such control that the moving velocity or the position of the light spot is detected and the light spot moves along a target velocity or position profile. If the optical head is moved by a distance of 10 mm for the time of 20 or less ms, as seen these years, the control band during seeking needs to be set considerably high. However, the negative effect of secondary resonance of the seek actuator hindered a rise of the control band.

It is also possible to take a countermeasure using the notch filter against the secondary resonance in the case of the seek control, but the same problem as explained above as to the focus control arose in that case.

SUMMARY OF THE INVENTION

An object of the present invention is to realize high-accuracy control by removing the negative effect of secondary resonance of an actuator for focusing, tracking, or seeking. Another object of the present invention is to allow the use of an actuator, for performing focusing, tracking, or seeking, of poor secondary resonance characteristics, thereby providing a low-cost apparatus with a low-cost actuator.

The above objects can be achieved by an optical information recording and/or reproducing apparatus for performing at least one of recording and reproduction of information as irradiating a recording medium with a light beam, comprising:

an actuator for moving the light beam relative to the medium;

a position detecting circuit for detecting a position of the actuator;

a circuit for generating a relative position error signal of the light beam to the medium;

a control loop for controlling the actuator in accordance with the relative position error signal;

a filter for differentiating an output from the position detecting circuit; and an adder for adding an output from the filter to a signal in the control loop.

The above objects can also be achieved by an optical information recording and/or reproducing apparatus for performing at least one of recording and reproduction of information as irradiating a recording medium having a plurality of tracks with a light beam, comprising:

an actuator for moving the light beam relative to the medium in a direction traversing the tracks of the medium;

a velocity detecting circuit for detecting a velocity of the actuator and outputting a real velocity signal;

a circuit for generating a target moving velocity of the light beam;

a control loop for controlling the velocity of the actuator, based on the real velocity signal and the target velocity signal;

a filter for differentiating the real velocity signal; and an adder for adding an output from the filter to a signal in the control loop.

The details will be explained in the description of the embodiments to follow.

DETAILED DESCRIPTION OF THE PREFERRED EMBODIMENTS

[Embodiment 1]

Figure 1:
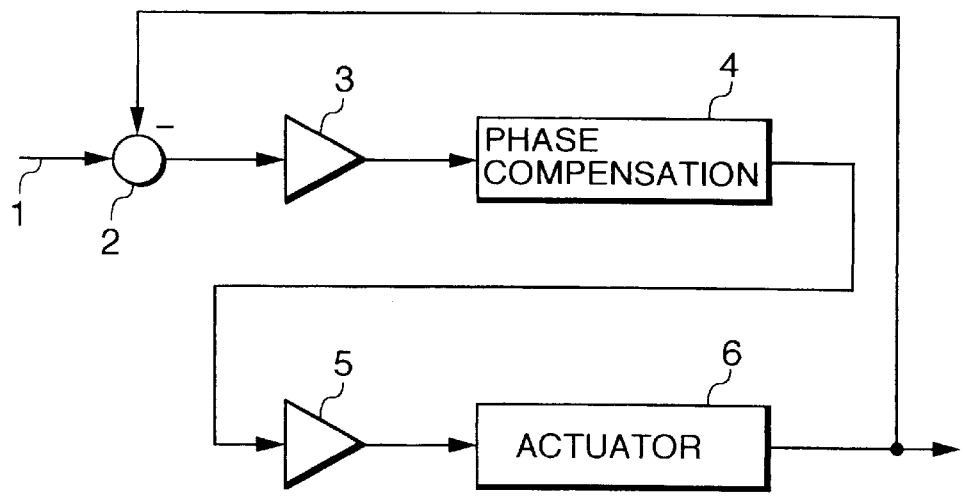
FIG. 1 is a block diagram of the conventional focusing or tracking servo system.
Figure 2:
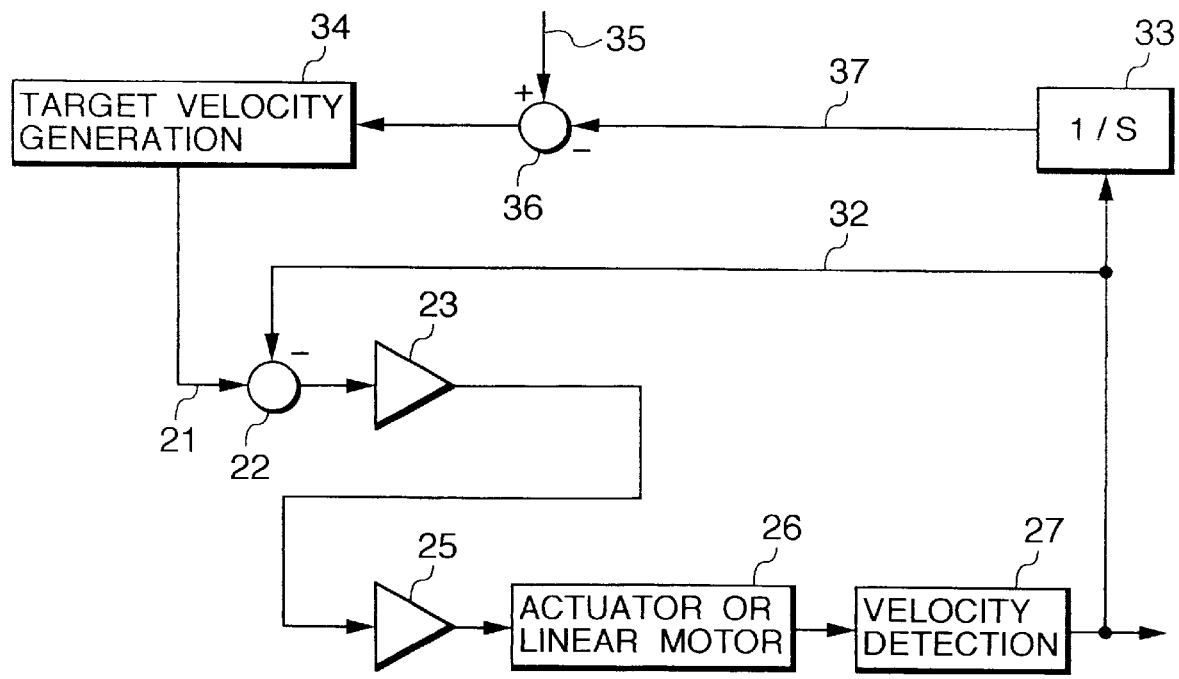
FIG. 2 is a block diagram of the conventional seek velocity control system.
Figure 3:
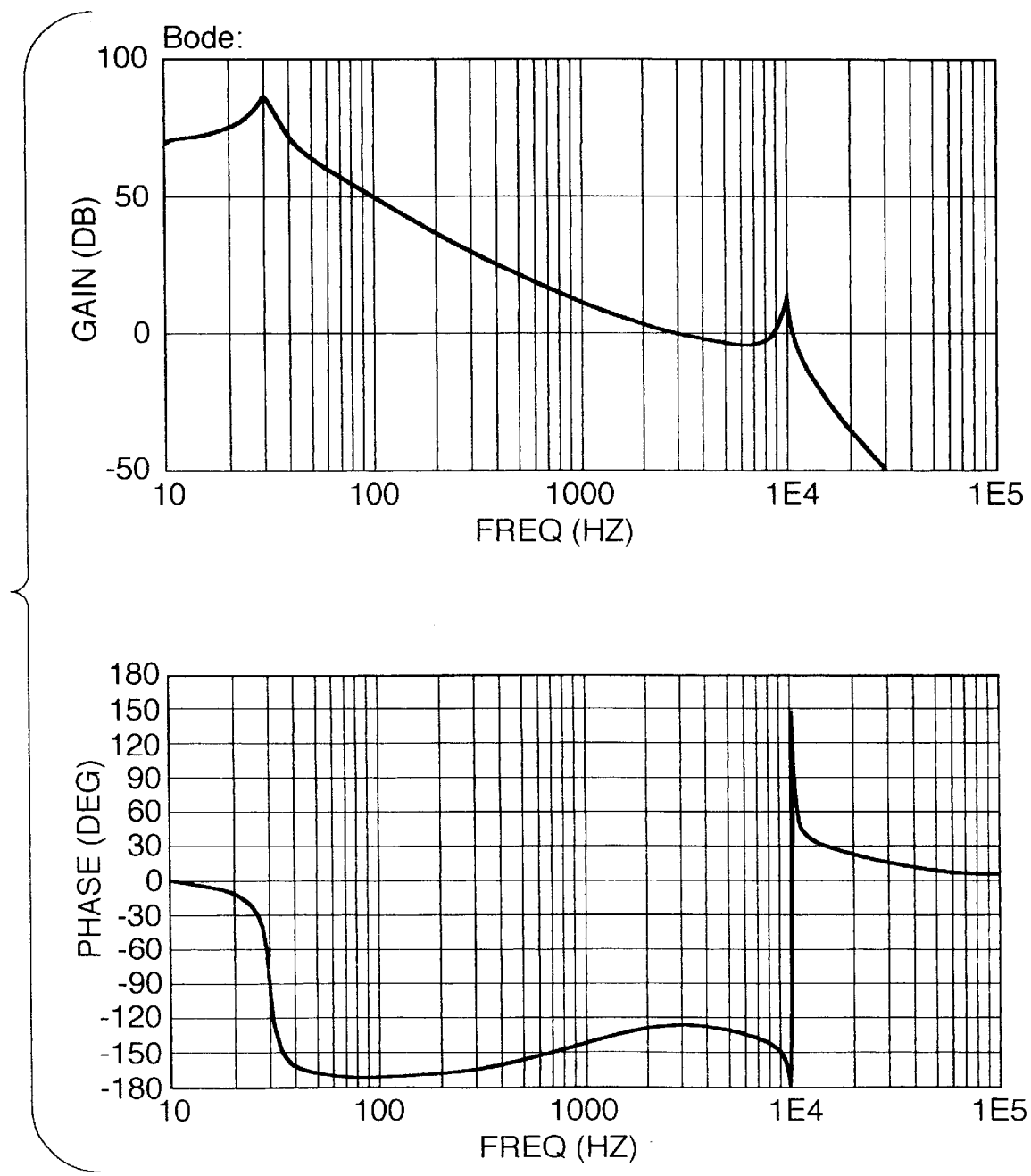
FIG. 3 shows Bode diagrams of open-loop transfer characteristics of the servo system shown in FIG. 1.
Figure 4:
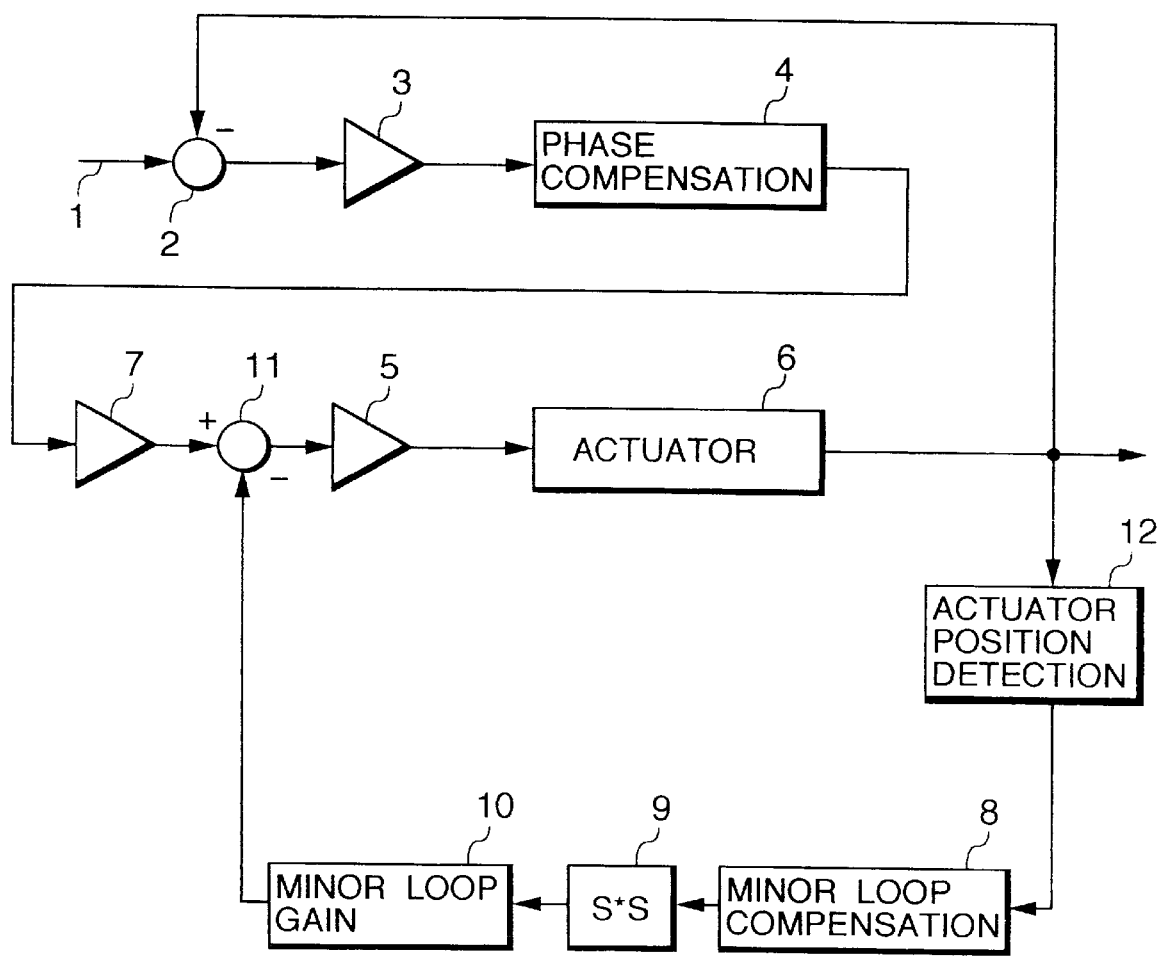
FIG. 4 is a block diagram of a focusing control system associated with the first embodiment of the present invention and a tracking control system associated with the third embodiment of the present invention.

Embodiment 1 according to the present invention is explained referring to FIG. 4. FIG. 4 is a block diagram of the focusing control loop in the optical disk apparatus. In the drawing, numeral 1 denotes a target value of the focusing control loop, which is practically the position in the focusing direction of the optical disk information surface. Numeral 2 designates a feedback point block, to which the position of the focusing actuator is negatively fed back. This feedback point is practically comprised of an optical system of the optical head, and a sensor, and a focusing error signal of an output from the sensor corresponds to an output from the feedback point 2. Numeral 3 represents an open-loop gain block, which is a block for determining a open-loop gain of the focusing servo loop. Numeral 4 stands for a phase compensation block, which is a phase compensation filter for stabilizing the focusing servo loop. Numeral 5 is a torque constant block of the focusing actuator, which indicates the sensitivity of the rotational power or the like of the actuator. Numeral 6 denotes the focusing actuator, which is a moving coil type motor having the same configuration, for example, as a dynamic speaker comprised of a moving coil, a permanent magnet, and a magnetic member. Numeral 7 is a compensation gain block, which is a block for compensating for a gain change due to the minor feedback and which is provided for convenience sake of explanation. The open-loop gain may include the compensation gain.

Next, numeral 8 is a phase compensation block for stabilizing the minor loop, and numeral 9 is a quadratic differential block having a second-order differential characteristic represented by s*s. It has the quadratic differential characteristic for the first-order differential of s=d/dt in the Laplace transfer characteristics. Numeral 10 denotes an open-loop gain block of the minor loop. Further, numeral 11 designates a minor feedback point block, which is negatively combined with an output from the compensation gain 7 and which supplies a drive signal to the focusing actuator 6. Numeral 12 is an actuator position detection block, which detects the position in the focusing direction of the focusing actuator. Although practical apparatus need a driver circuit for driving the actuator 6, which is normally interposed between the minor feedback point block 11 and the torque constant block 5, illustration thereof is omitted herein.

Here, the characteristics of the focusing actuator can be described as a second-order lag system as expressed by the following simplified form of transfer function representation:

$$1/m \times (s^2 + 2\zeta\omega s + \omega^2).$$

In the representation, m is a mass of the actuator 6, $\zeta$ an attenuation ratio, $\omega$ is the primary resonance frequency, and s is a Laplace operator. There is the relation of $\omega = 2\Pi f$ between frequency f and angular frequency $\omega$.

Figure 5:
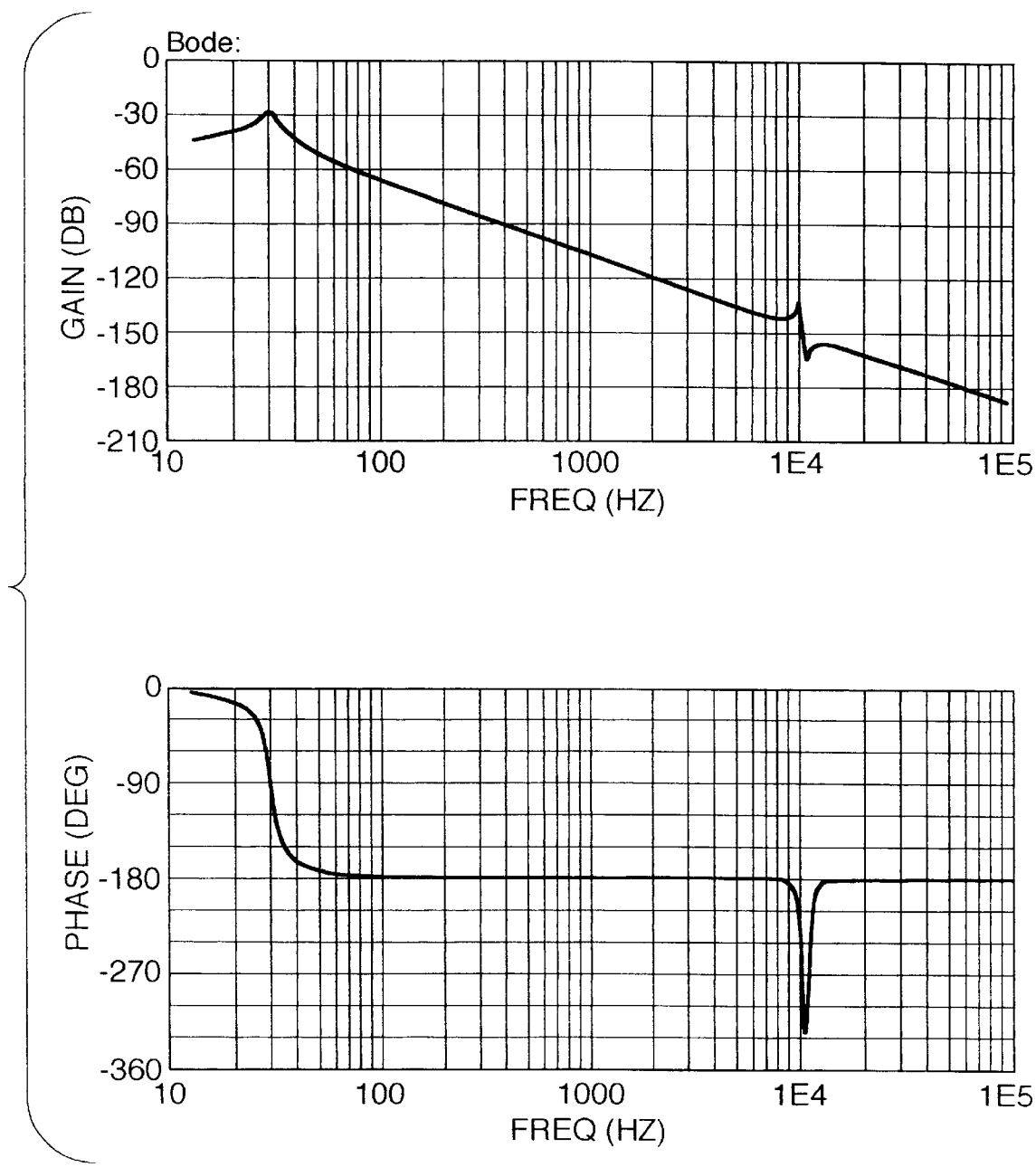
FIG. 5 shows the frequency characteristics of the focusing or tracking actuator.

FIG. 5 shows the characteristics of the focusing actuator used in the present embodiment. The characteristics were obtained when the primary resonance frequency was 30 Hz, the secondary resonance frequency was 10 kHz, the attenuation ratio was 0.5, and the mass was 5 g. Since the torque constant is 1 N/A, the characteristics are transfer characteristics of from a drive application current to the the optical pickup position by the actuator. There appears the secondary resonance near 10 kHz.

Figure 6:
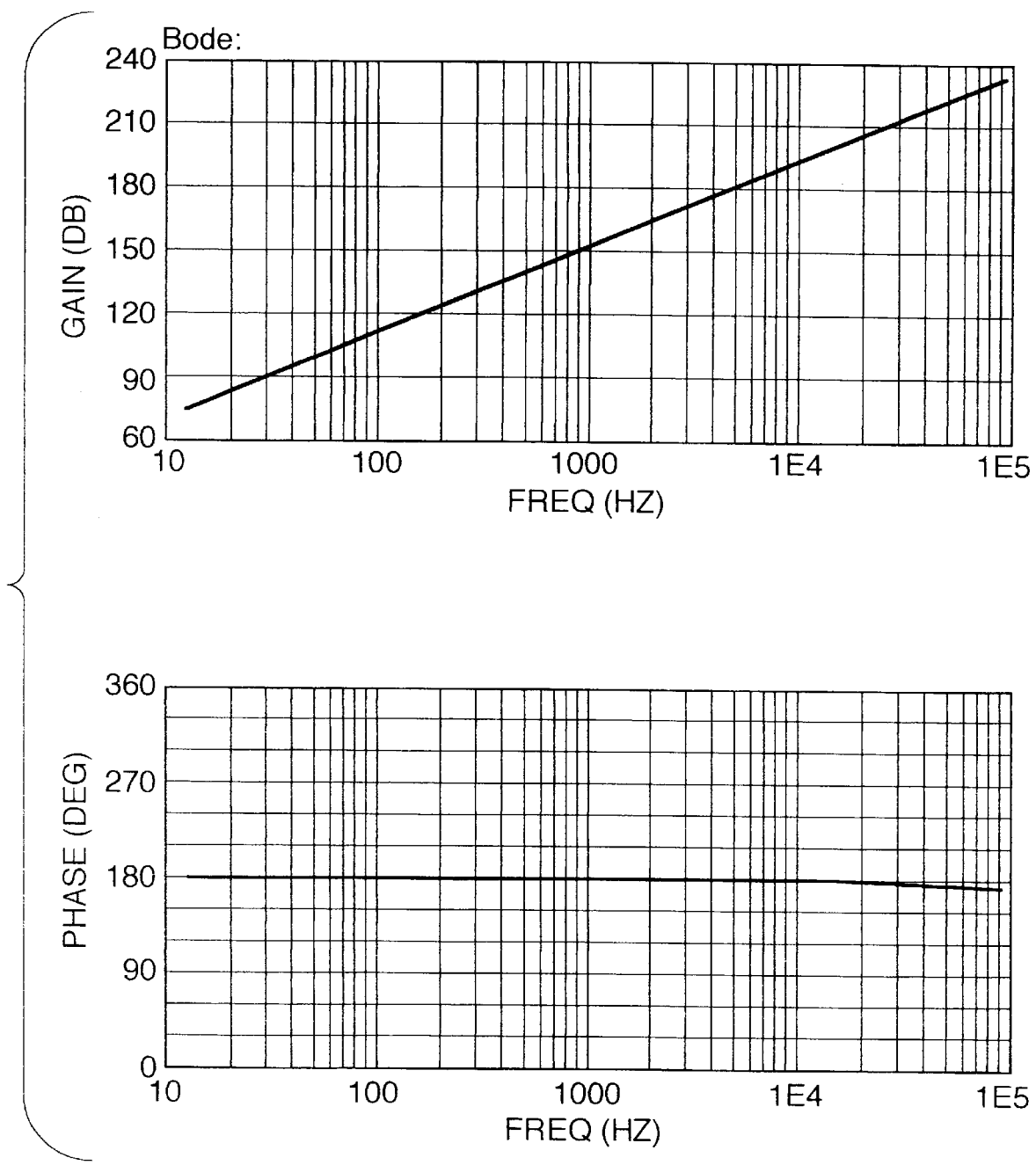
FIG. 6 shows the frequency characteristics of a quadratic differential characteristic block 9.

FIG. 6 shows frequency characteristics of the quadratic differential block 9. Since it is impossible to realize a perfectly ideal differential characteristic, the frequency characteristics are set to be regarded as a nearly differential characteristic at least in the range of the control band. In this connection, the characteristics shown in FIG. 6 can be expressed by the transfer function, $(s/(1+sT))^2$, where $T=10^{-7}$.

The point is that the quadratic differential characteristic should include a quadratic differential characteristic in the necessary frequency range. Further, another arrangement of the minor loop may be such that the quadratic differential block 9 has inverse characteristics of the ideal actuator transfer characteristics not including the secondary resonance component, instead of the quadratic differential characteristic. In the case of this arrangement, the characteristics near the primary resonance frequency can be ignored.

Here, the minor feedback loop is formed in order to decrease the effect of the secondary resonance present in the actuator. The minor loop gain 10 in this case is determined by taking account of the gain calculated from the actuator characteristics and the torque constant. In the present embodiment, the gain calculated from the actuator characteristics and the torque constant is the reciprocal of the mass of the actuator, which is 200; thus, the minor loop gain is 0.005, and the open-loop gain at some kHz of the minor loop is 0 dB.

In order to reduce the effect of the secondary resonance, the minor loop gain is further increased to be five times the above value, i.e., to be 0.025.

Figure 7:
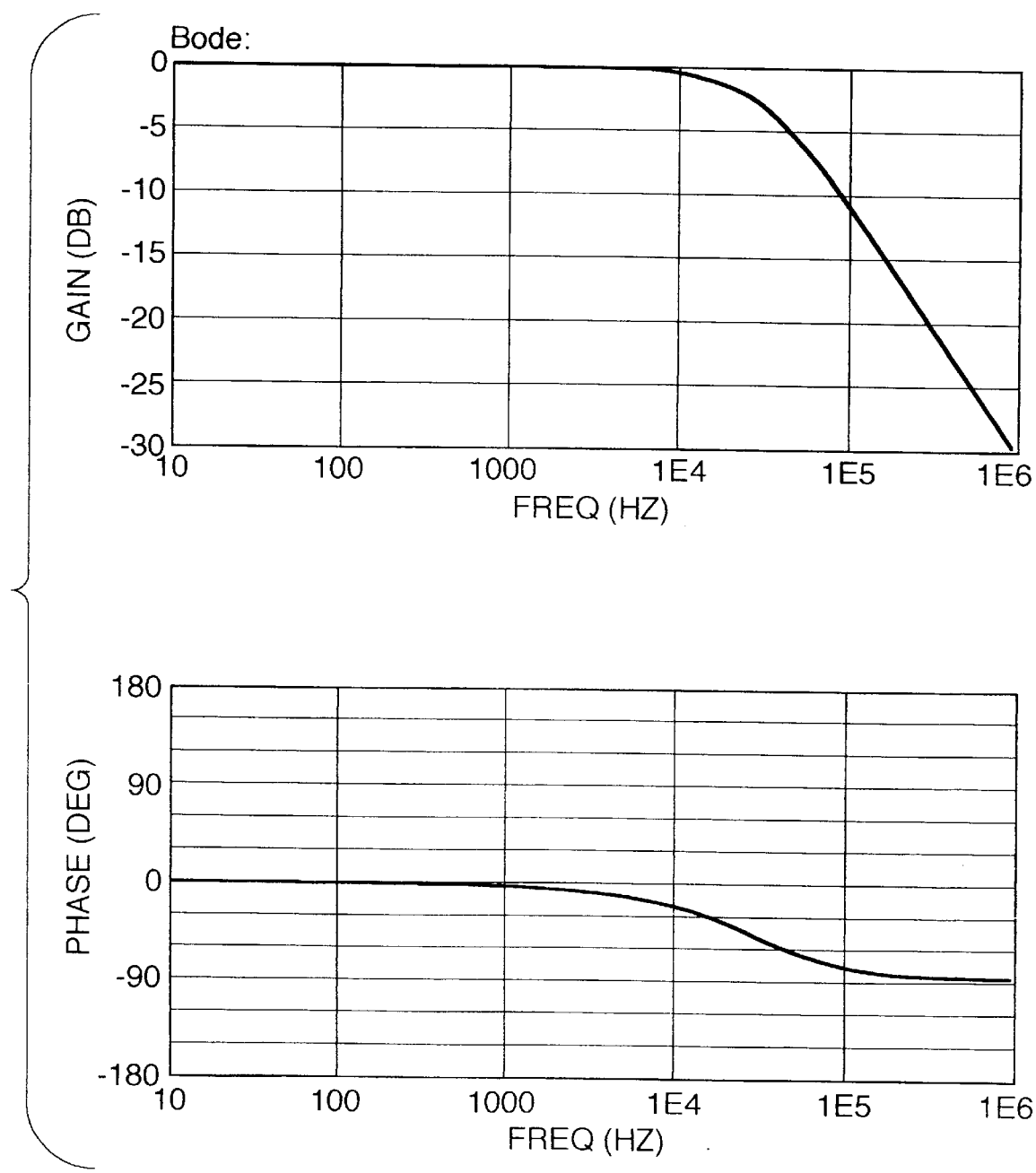
FIG. 7 shows the frequency characteristics of minor loop compensation associated with the first embodiment of the present invention.

In order to secure the stability of the minor loop, the minor loop compensation block 8 is provided with a low-pass filter characteristic. The frequency compensation characteristics shown in FIG. 7 are the minor loop compensation characteristics this time, which are expressed by the following transfer function representation:

$1/(1+sT)$ wherein $T=5\times10^{-6}$.

This minor loop compensation block 8 is determined taking account of the characteristics of secondary resonance or the characteristics of the driver of the actuator, an operational amplifier, etc., not shown formed in the minor loop.

Figure 8:
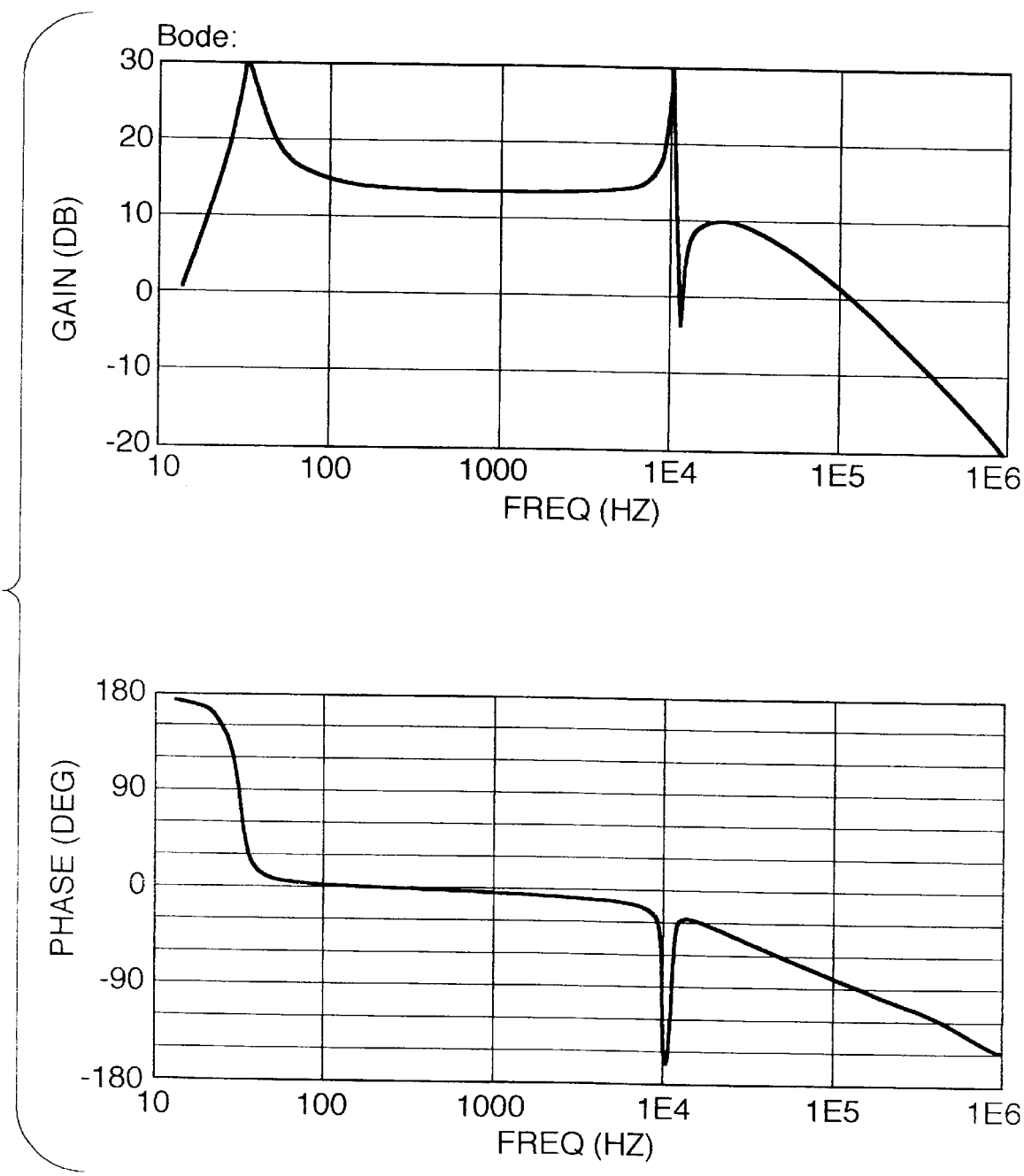
FIG. 8 shows Bode diagrams of open-loop transfer characteristics of the minor loop associated with the first embodiment of the present invention.
Figure 9:
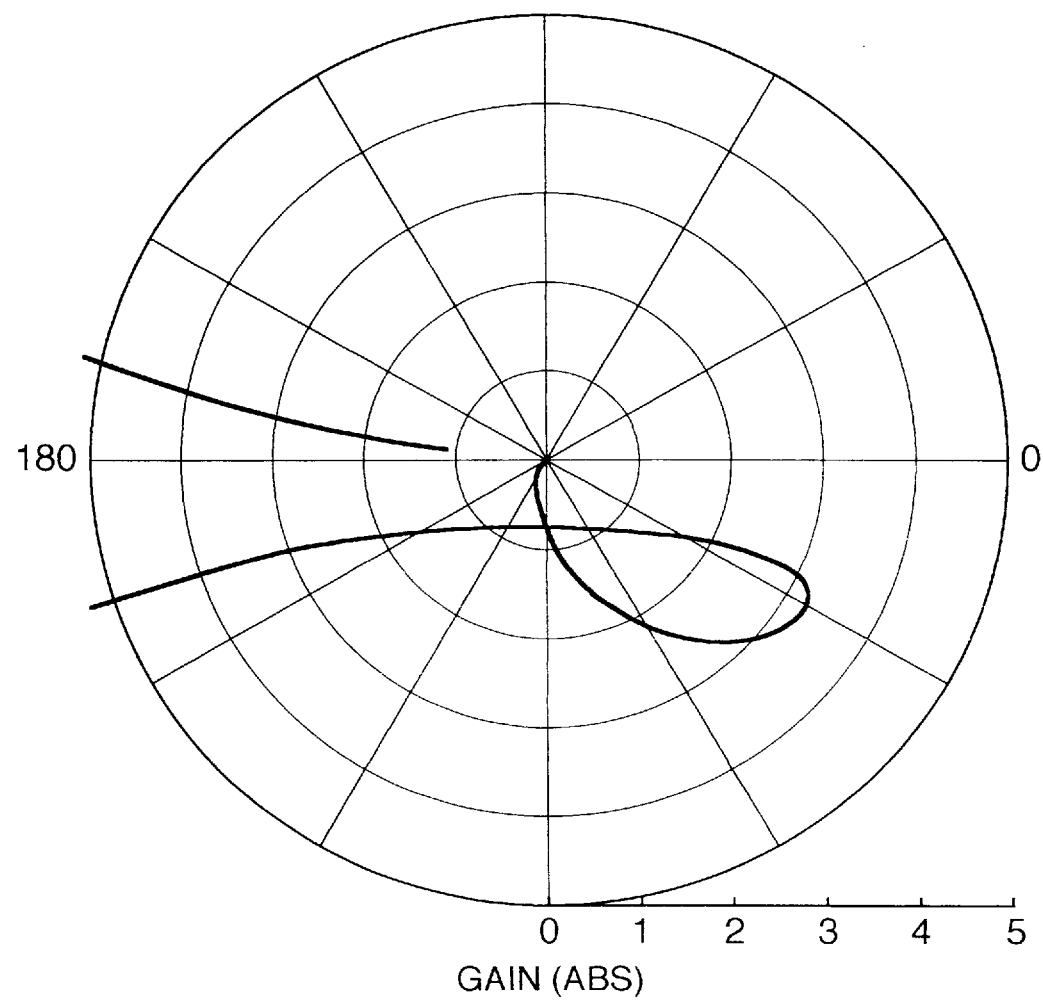
FIG. 9 is a Nyquist diagram of the open-loop transfer characteristics of the minor loop associated with the first embodiment of the present invention.

FIG. 8 and FIG. 9 show Bode diagrams and a Nyquist diagram to show the open-loop transfer characteristics of the minor loop including the actuator 6. The minor loop compensation is effected so as to have a phase margin at the cross frequency of zero cross of the minor loop and so as to maintain a stable gain-phase relation near the secondary resonance frequency 10 kHz as in the present embodiment.

The formation of the minor loop changes the transfer gain of from the plus input from the compensation gain block 7, of the minor feedback point to the actuator output. For that purpose, the compensation gain according to the minor loop gain is imaginarily set. The minor loop gain determines the closed-loop transfer characteristics of the minor loop, and in the case of the present embodiment, the fivefold (about 14 dB) gain is given in the main frequency range of from some 100 Hz to some kHz, as described above, whereby the closed-loop transfer gain becomes 1/(1+5). By setting six times (15.6 dB) the gain as the compensation gain of the compensation gain block 7, the transfer gain of from the input of the compensation gain to the actuator output becomes the same as the actuator gain in the non-operating condition of the minor loop. Namely, the compensation gain is determined to be a value obtained by adding 1 to the gain (fivefold gain herein) in the open-loop characteristics of the minor loop. This compensation gain can be realized in the form included in the open-loop gain 3 in practical applications, but resetting of the open-loop gain becomes easier in designing the loop by using the concept of the compensation gain 7.

Figure 10:
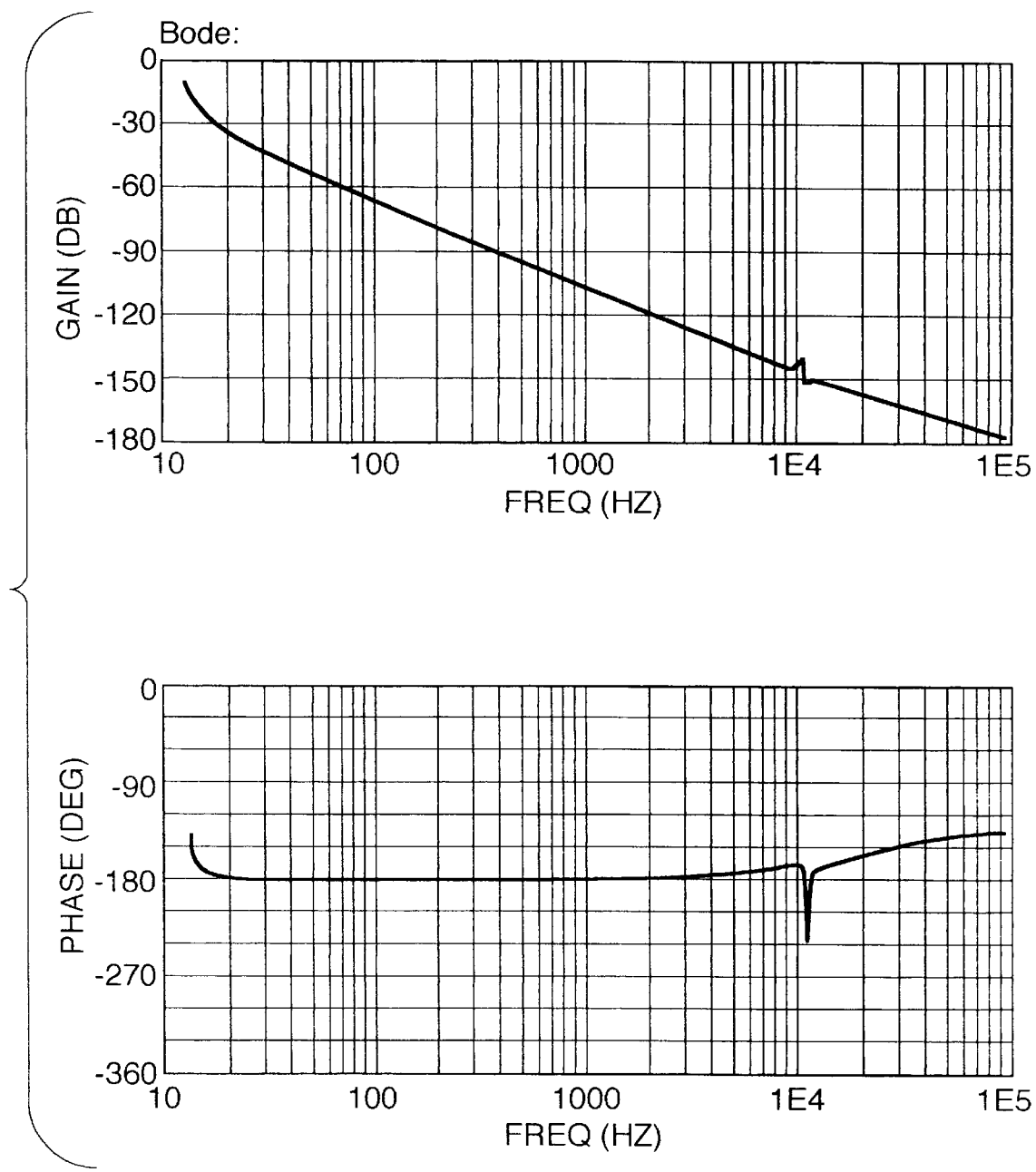
FIG. 10 shows the closed-loop transfer characteristics of the region around the minor loop associated with the first embodiment of the present invention.

FIG. 10 shows the transfer characteristics of from the input of the compensation gain to the actuator output when the minor loop is active. It is seen from the drawing that the secondary resonance near 10 kHz became remarkably smaller than the resonance in FIG. 5. As discussed, provision of the minor loop can decrease the secondary resonance and can broaden the control band, as compared to that of about 3 kHz by conventional technology as discussed previously.

Use of the present invention enables the use of actuators having low secondary resonance frequencies or actuators having a large peak of secondary resonance, which permits the use of cheap actuators with low rigidity or cheap actuators with low production accuracy, thus providing a low-cost optical disk apparatus.

Further, use of the present invention can reduce the dispersion in the sensitivity of the actuator. Even with some dispersion in the sensitivity of actuator, the effect of the minor loop can remarkably decrease the dispersion. This is because the closed-loop transfer characteristics of the minor loop become closer to the inverse characteristics of the characteristics determined by the quadratic differential characteristic and the minor loop gain interposed in the feedback loop. This effect can be enhanced by increasing the minor loop gain. The dispersion of the actuator can also be decreased by this effect, and in combination thereof with the secondary resonance restricting effect, the control band can be broadened. Since the dispersion in the actuator sensitivity is permissible, cheap actuators with low production accuracy can be used, thus providing a low-cost optical disk apparatus.

Figure 11:
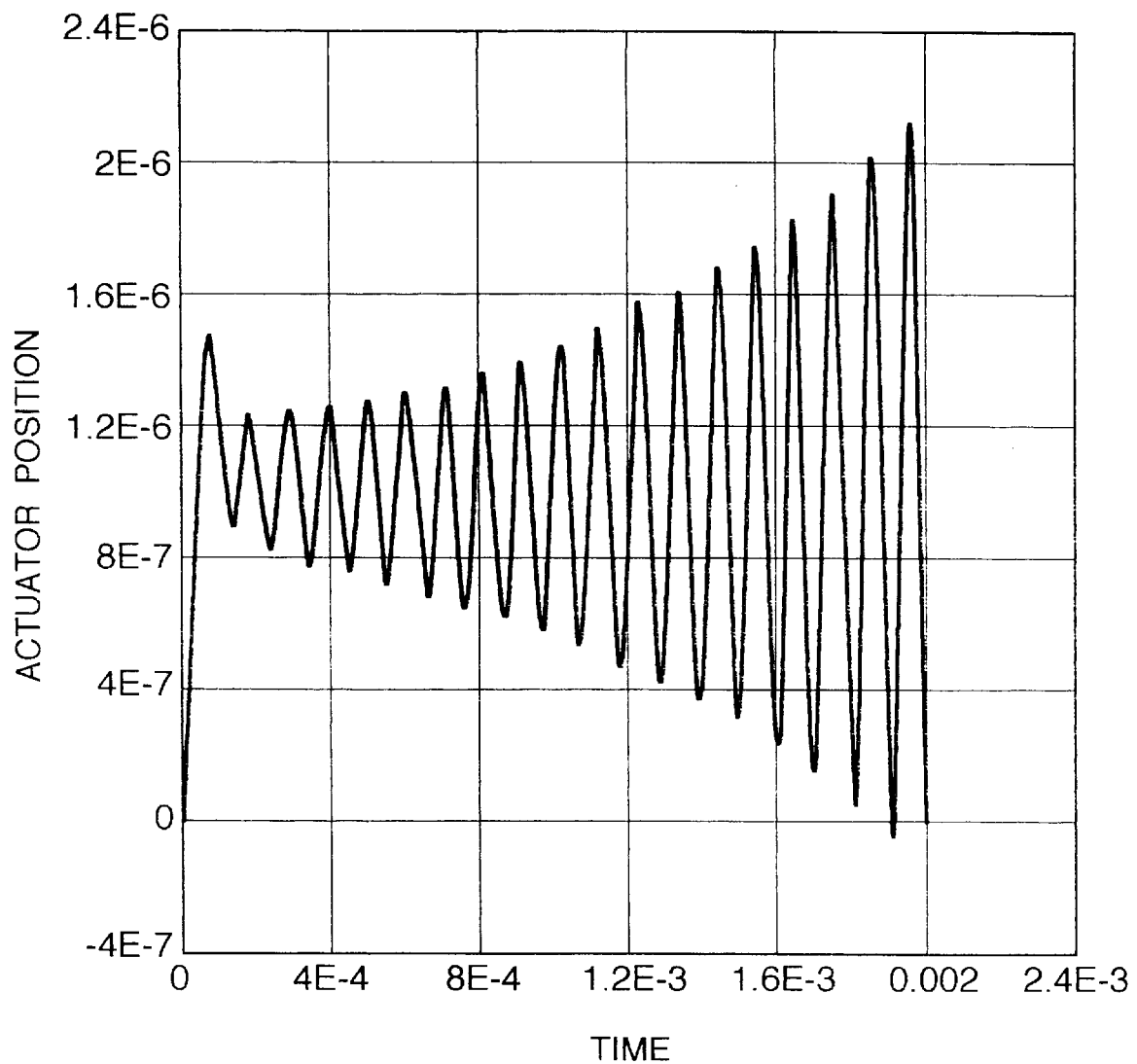
FIG. 11 shows a step response waveform of the servo system according to the conventional example.
Figure 12:
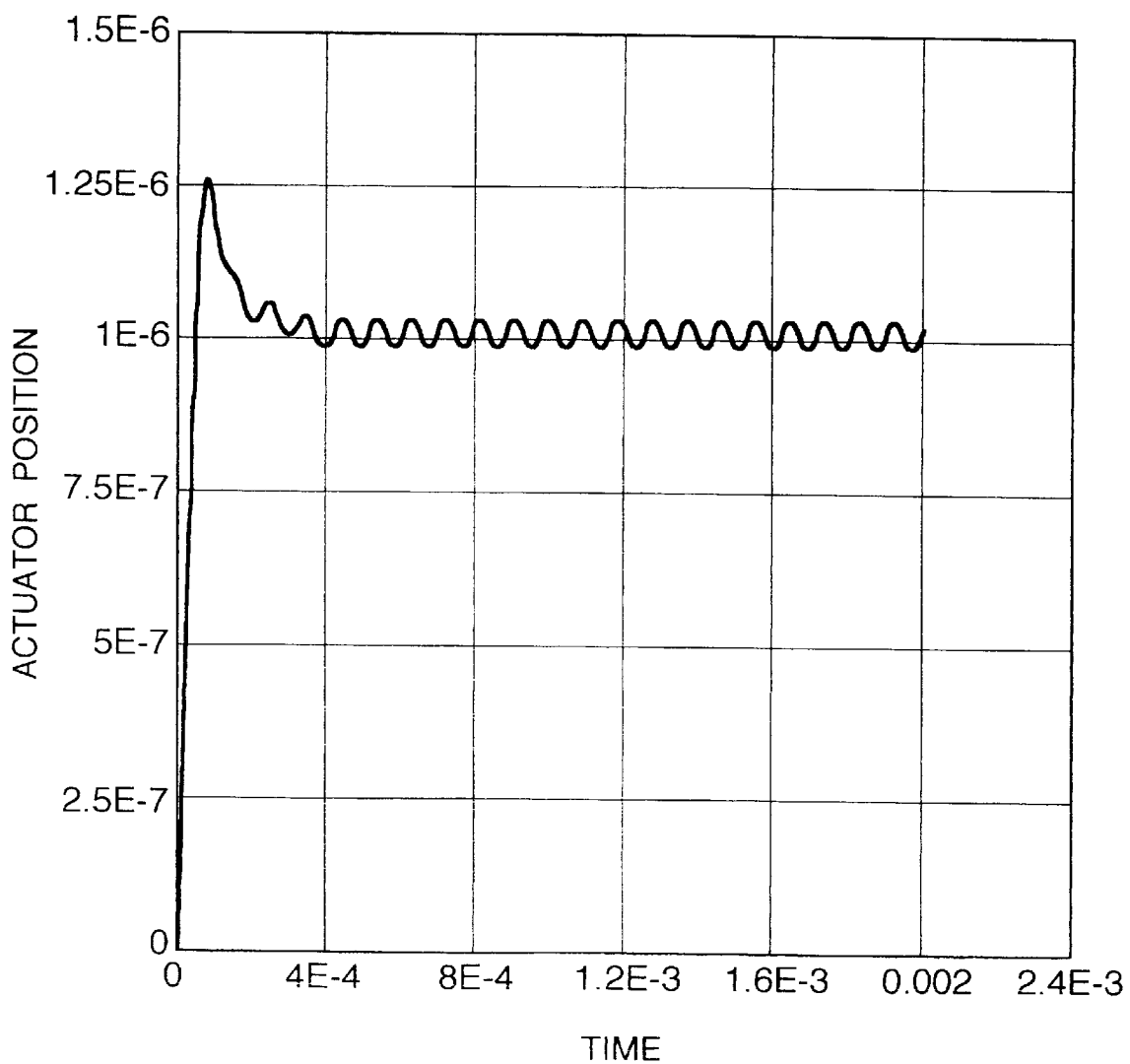
FIG. 12 is a step response waveform of the servo system according to the present invention.

FIG. 11 shows a step response of the servo loop formed by the conventional method, while FIG. 12 shows a step response of the servo loop applying the present invention. The conventional method results in the secondary resonance oscillating the actuator, whereas the present invention can control the actuator at a small vibration level without oscillating the actuator. It is, of course, also possible to greatly decrease the vibration amounts by applying the present invention to a servo loop that is not oscillating, but tending to vibrate in the conventional method because of the effect of secondary resonance to have a large control error. Namely, the control accuracy can be improved.

Next explained is an example using another actuator having characteristics of secondary resonance (see FIG. 13) different from those shown in FIG. 5.

In the case of the actuator having the secondary resonance of this type, phase lead compensation is used as minor loop compensation.

Figure 13:
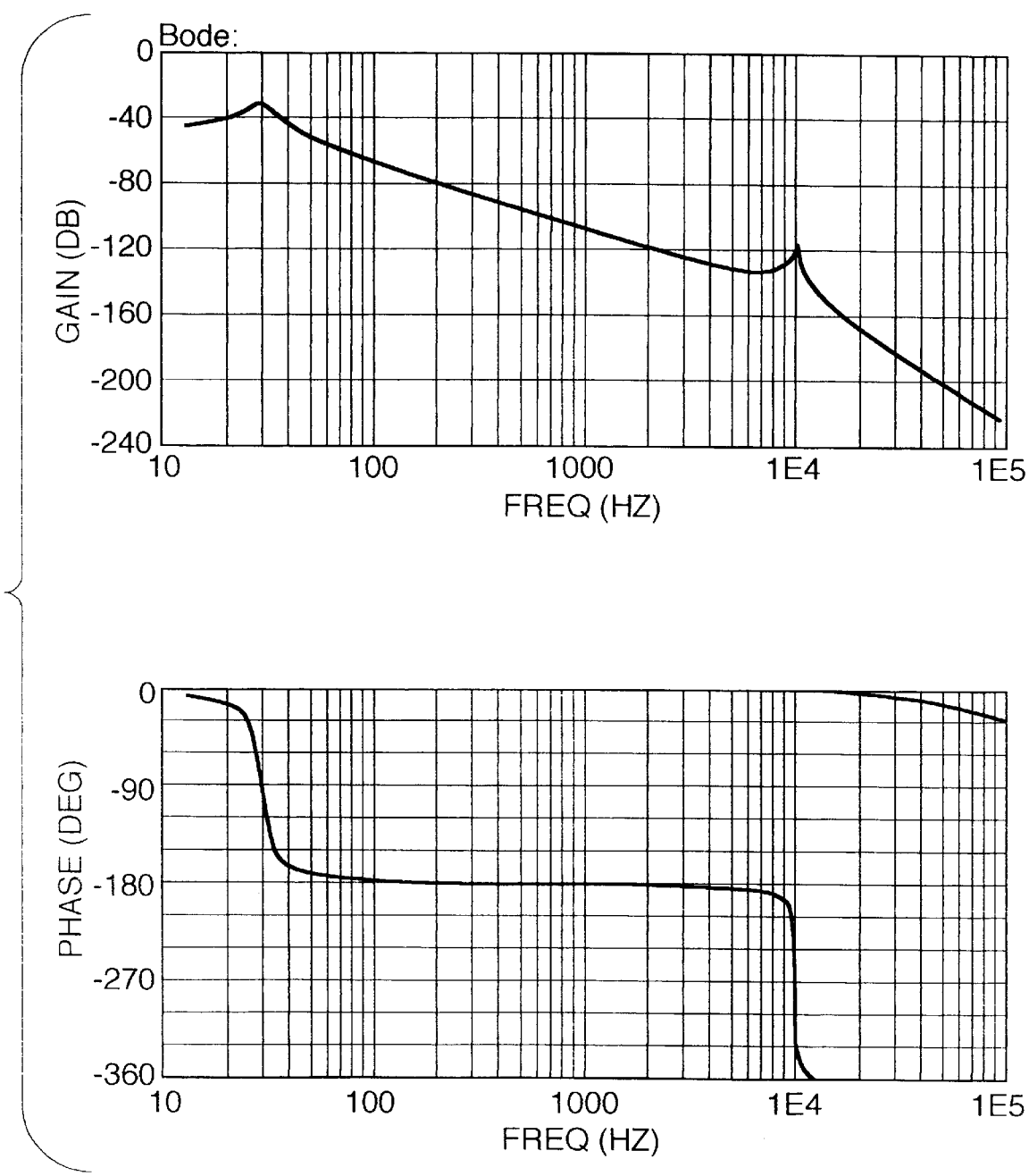
FIG. 13 shows the frequency characteristics of another actuator associated with the first embodiment of the present invention.
Figure 14:
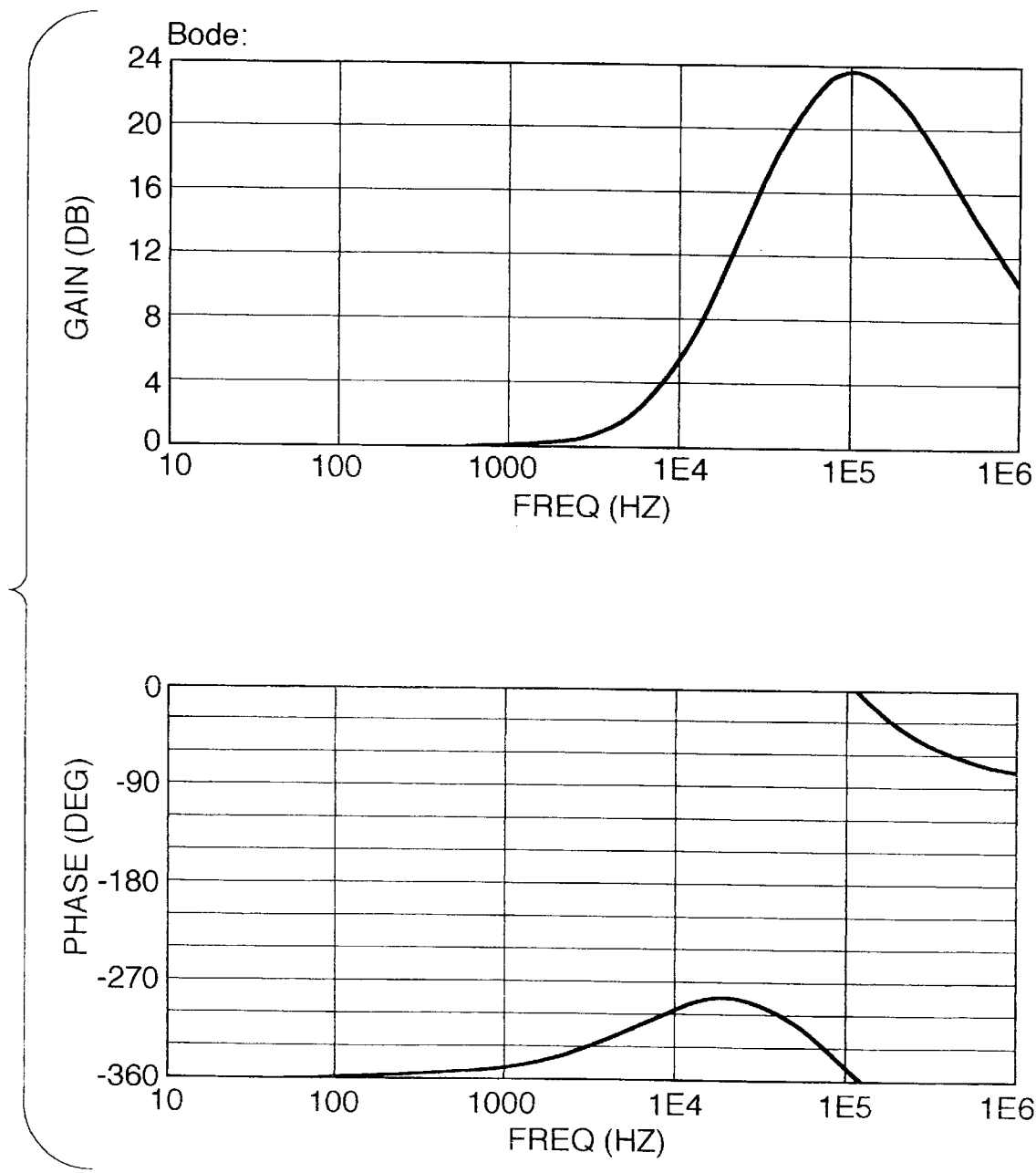
FIG. 14 shows the frequency characteristics of another minor loop compensation associated with the first embodiment of the present invention.

FIG. 14 shows the frequency characteristics of an example of minor loop compensation suitable for the actuator characteristics of FIG. 13. The transfer function representation of the characteristics is a series connection of the following phase lead compensation with second-order pole and zero:

$\{Z(2)s^2=Z(1)\ s+Z(0)\}/\{P(2)s^2+P(1)s+P(0)\}$ where $Z(0)=3.0\times10^{11}$, $Z(1)=1.3\times10^7$, $Z(2)=100$, $P(0)=3.9\times10^{11}$, $P(1)=1.3\times10^6$, $P(2)=1$, with a first-order lag element expressed as follows:

$1/(1+sT)$ where $T=5\times10^{-6}$.

Since an appropriate gain of 1 or more can be set at the secondary resonance frequency in the case of minor loop compensation of this type, the secondary resonance can be adequately reduced even when the minor feedback gain is set to 0.005 so as to set the open-loop gain near some 100 Hz to 0 dB. As discussed previously, because the main gain of the minor loop is 1, the compensation gain 7 is set to 2.

Figure 15:
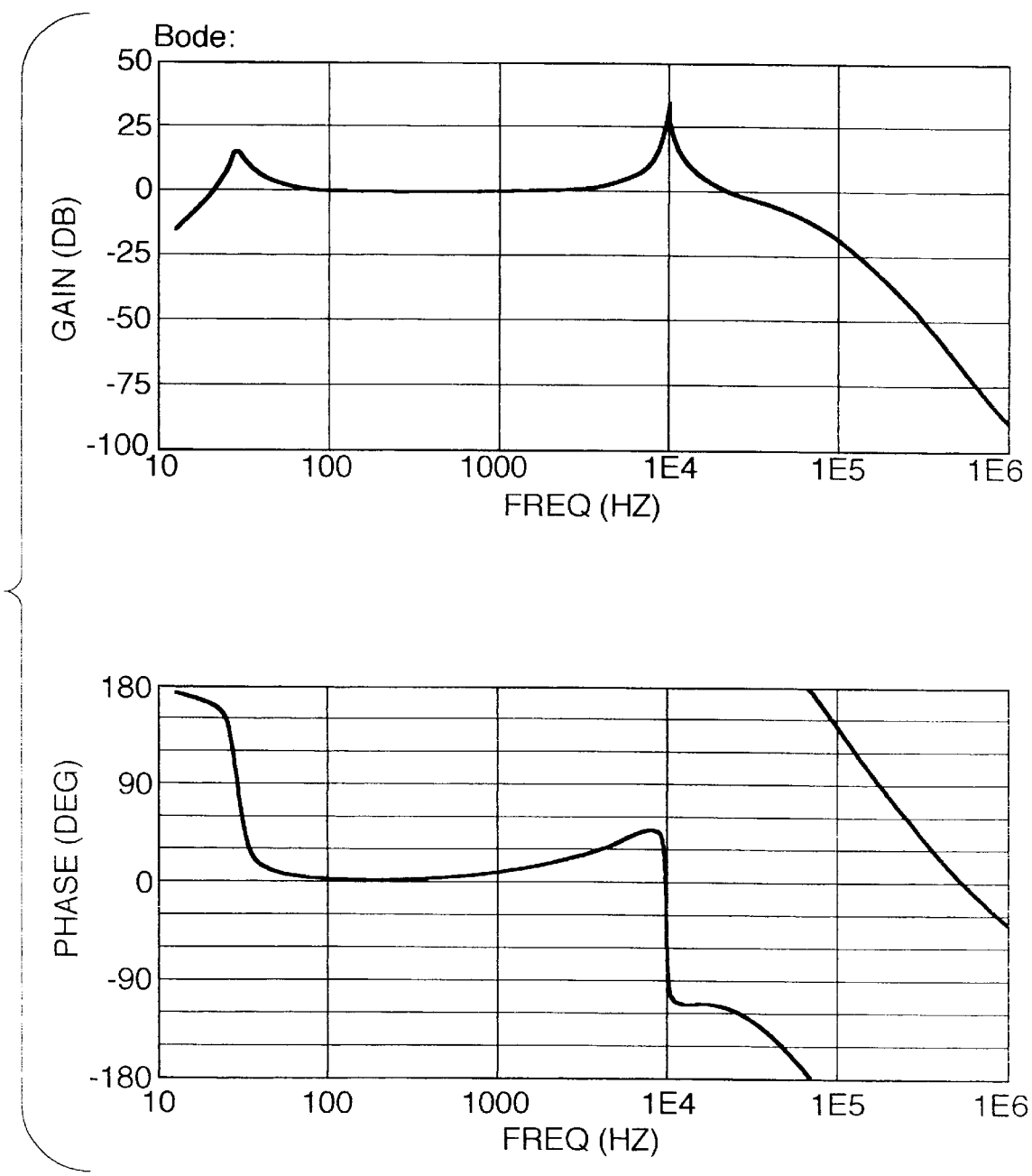
FIG. 15 shows Bode diagrams of open-loop transfer characteristics of the another minor loop associated with the first embodiment of the present invention.

FIG. 15 shows the open-loop transfer characteristics of the minor loop. It is important to apply the minor loop compensation that can stabilize the minor loop as shown.

Figure 16:
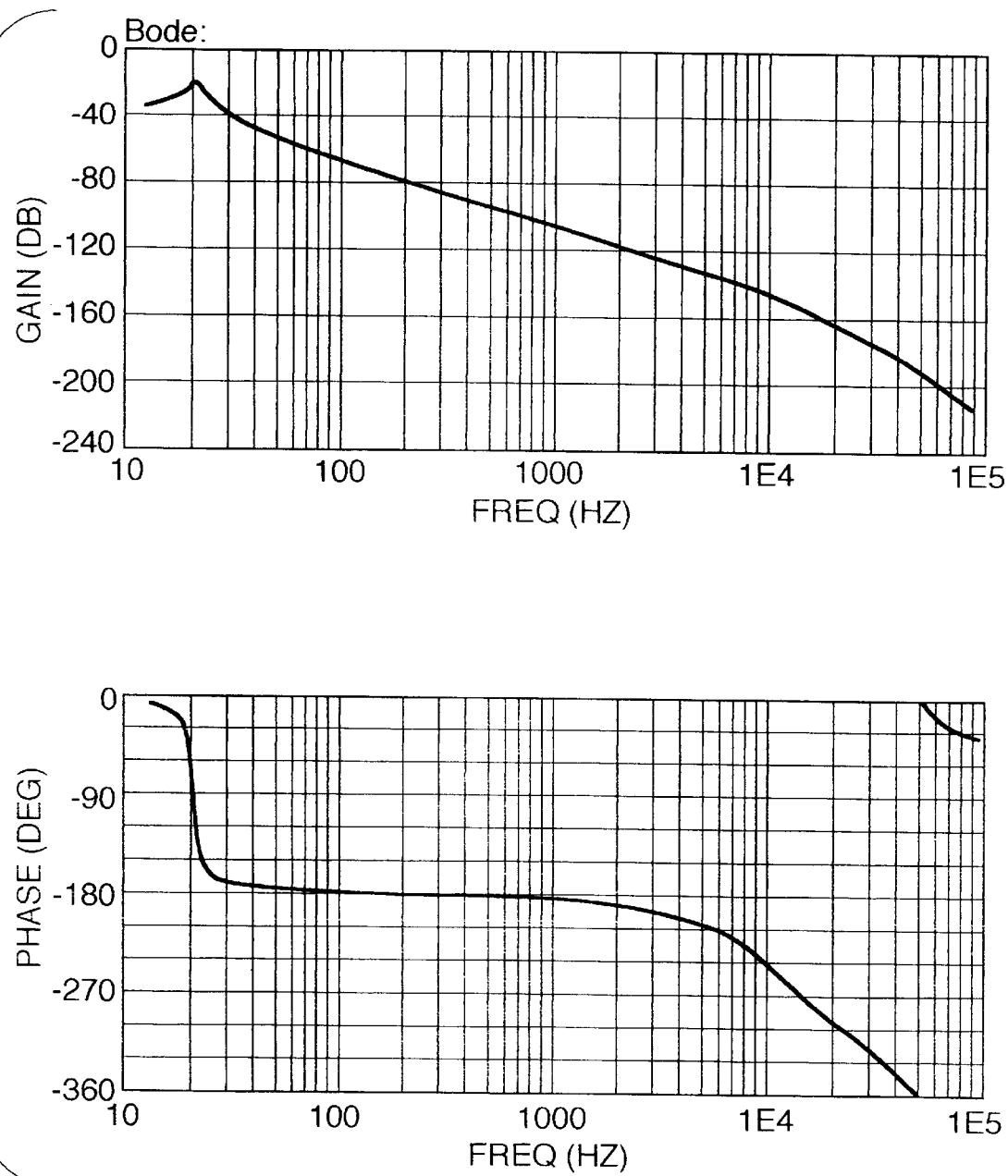
FIG. 16 shows closed-loop transfer characteristics of the region around the another minor loop associated with the first embodiment of the present invention.

FIG. 16 shows the transfer characteristics of from the input of the compensation gain block 7 to the output of actuator 6 when the minor loop is effective using the actuator of FIG. 13. It is seen from the drawing that the secondary resonance near 10 kHz in FIG. 16 became remarkably smaller than that in FIG. 13. The secondary resonance can be decreased in this manner and the control band can be broadened as compared with that in the conventional technology.
[Embodiment 2]

Figure 17:
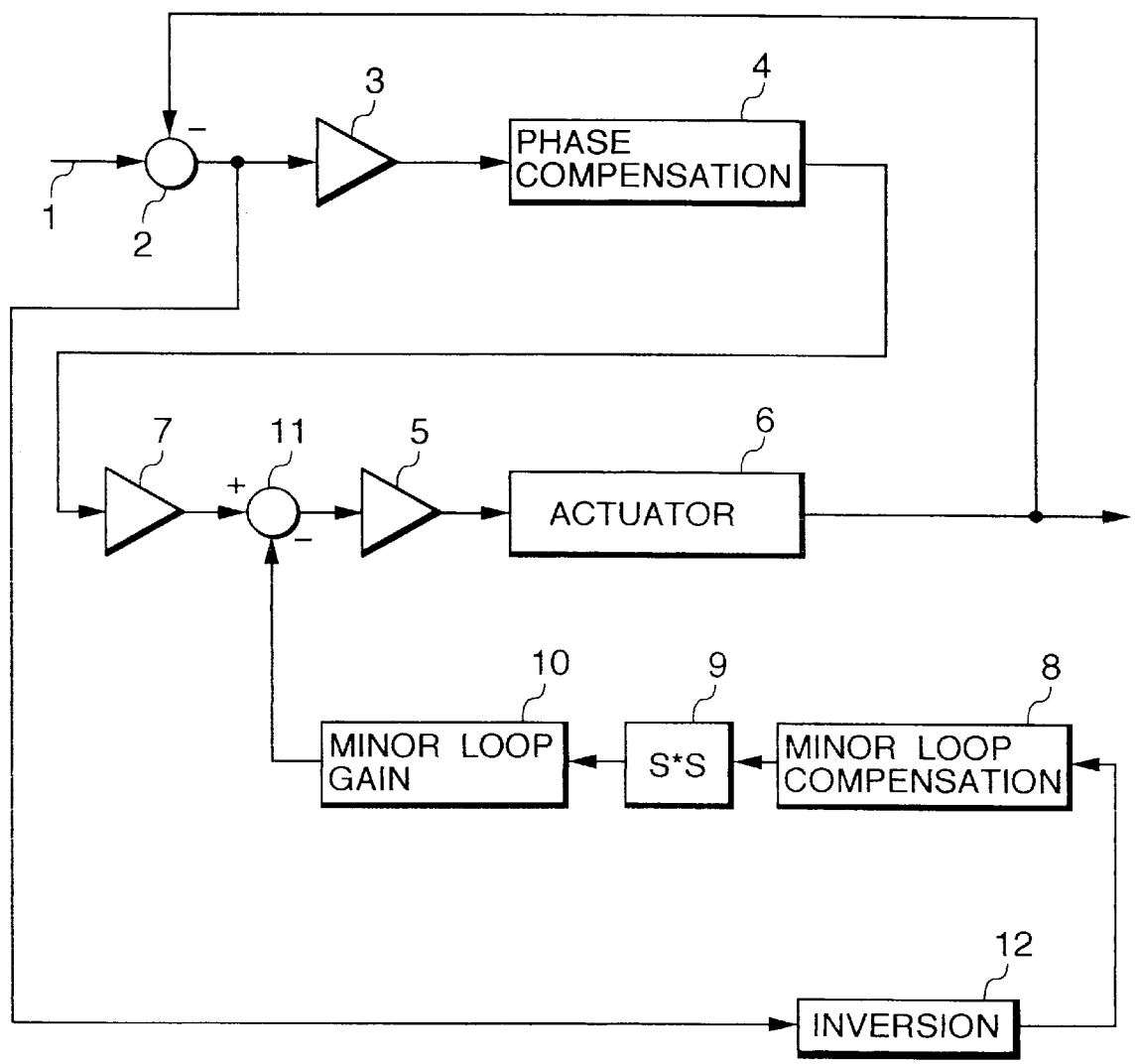
FIG. 17 is a block diagram of a focusing control system associated with the second embodiment of the present invention and a tracking control system associated with the third embodiment of the present invention.

FIG. 17 shows the second embodiment of the present invention. The second embodiment is different from the embodiment of FIG. 4 in that, without directly detecting the position of the actuator, the output of the feedback point block 2 (corresponding to the focusing error signal) is used in the minor loop. Since the actuator output is input into the feedback point 2 as inverting the polarity thereof, an inversion block 12 is provided for changing the polarity. Since the inversion block 12 simply performs only inversion of the polarity, the minor loop gain 10 may be practically set to be negative or the inversion may be effected anywhere in the minor loop.

Embodiment 1 described above needs a sensor for measuring the position of the actuator (for example, a lens position sensor or the like for detecting the position of the objective lens), or an observer, whereas the present embodiment permits the minor loop to be formed using the focusing error signal, which simplifies the configuration. Further, the present embodiment permits the actual movement of the light spot to be detected with accuracy and the secondary resonance to be decreased at high accuracy.

The characteristics contributing to the feedback loop of negative feedback by this minor loop greatly decrease the degree of occurrence of secondary resonance, similarly as in Embodiment 1, thereby achieving the characteristics shown in FIG. 16. Since the arrangement becomes simpler than that of Embodiment 1, the present embodiment can provide a low-cost focusing servo apparatus with wide-band frequency characteristics.
[Embodiment 3]

Next explained is an example in which the present invention is applied to a tracking servo. The basic configuration is the same as that of the focusing servo.

The tracking servo is explained referring to FIG. 4. Although it was explained as a focusing servo in the previous embodiment, the circuit blocks in FIG. 4 can also be applied to the tracking servo. FIG. 4 is taken as a block diagram of the tracking control loop. In the drawing, reference numeral 1 denotes a target value of the tracking control loop, which is practically the position in the tracking direction of an information track of the optical disk. Numeral 2 designates the feedback point, to which the position of the tracking actuator 6 is negatively fed back. This feedback point 2 is practically comprised of an optical system of an optical head, and a sensor, and a tracking error signal of a sensor output corresponds to the output from the feedback point 2. Numeral 3 is an open-loop gain, which is a block for determining an open-loop gain of the tracking servo loop. Numeral 4 represents a phase compensation device, which is a phase compensation filter for stabilizing the tracking servo loop. Generally, it is a phase lag compensation circuit or a phase lead compensation circuit.

Further, numeral 5 stands for a torque constant of the tracking actuator, which indicates the sensitivity of an actuator. Numeral 6 is the tracking actuator. Numeral 7 denotes a compensation gain, which is a block for compensating for a gain change due to minor feedback, which is provided for convenience sake of explanation, and which may be included in the open-loop gain. Numeral 8 is phase compensation for stabilizing the minor loop, 9 is a quadratic differential characteristic block, and 10 is an open-loop gain of the minor loop. Further, numeral 11 denotes the minor feedback point, which is combined with the output of the compensation gain 7 to supply a drive signal to the actuator 6. Further, numeral 12 is an actuator position detection block for detecting the position in the tracking direction of the tracking actuator. Practical apparatus need a drive circuit for driving the actuator, which is normally interposed between the minor feedback point and the torque constant, but it is omitted herein.

The above configuration permits the present invention to be applied to the tracking control loop.

It is normally necessary to set the band wider for the tracking servo loop than for the focusing servo loop because of the relation between change amounts of the target value and the accuracy required, and the accuracy of the tracking servo can be improved by applying the present invention.

Recent tracking servos tend to employ the method for performing seek and tracking with a single actuator over the entire surface of disk, as seen in the official gazette of Japanese Patent Application Laid-open No. 5-298724. This single actuator arrangement can decrease the number of actuators in the apparatus, which can decrease the dissipation power or which can decrease the mechanical and control systems for drive and control, thereby realizing a low-cost apparatus. It is, however, difficult for the servo circuit in the above official gazette to decrease the secondary resonance or to raise the secondary resonance frequency because of its mechanism. Applying the present invention to this case, a wide tracking servo band can be secured even in the single actuator arrangement.
[Embodiment 4]

Figure 18:
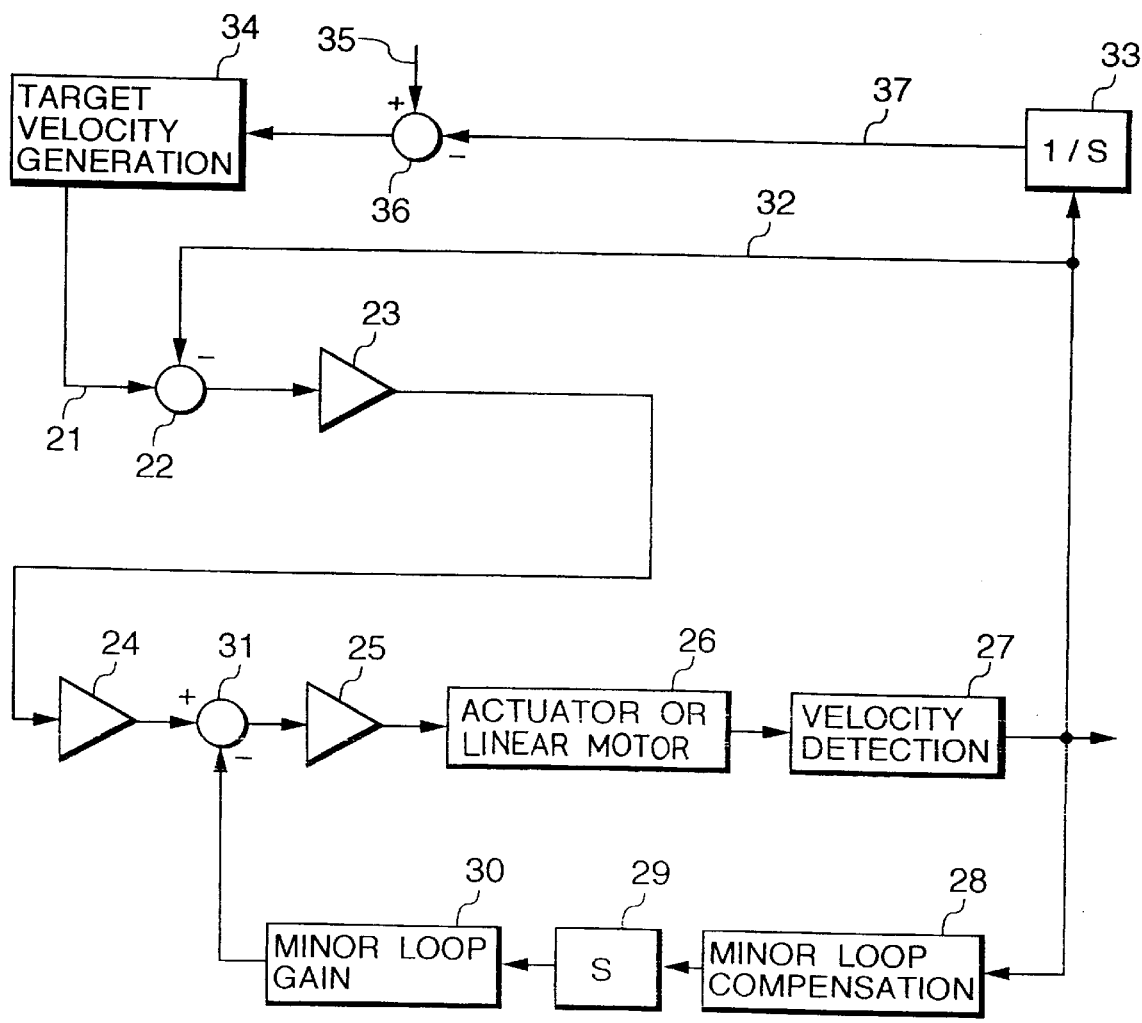
FIG. 18 is a block diagram of a velocity control system used in the seek operation of the optical disk apparatus associated with the fourth embodiment of the present invention.

FIG. 18 is a block diagram of a velocity control system used in the seek operation of the optical disk apparatus. In the drawing, reference numeral 35 designates a target track position, to which data indicting the position of an information track desired to be accessed is input. Numeral 36 an error calculating block of the residual distance, which subtracts the track position where the light spot is located at present, which is the track position derived as an actuator position 37 by integrating an integral component 32 of actuator 26 by an integral element 33, from the target track position 35, and which outputs a remaining distance for access. Numeral 34 is a target velocity generation block, which outputs a target value of the moving velocity of the light spot according to the residual distance. Normally, this target velocity takes a profile in which the velocity decreases as the optical head approaches the target track.

The target velocity value 21 generated in the target velocity generation block 34 is input to the feedback point 22. The velocity of the light spot, that is, the velocity of the actuator or linear motor 26 is negatively fed back to the feedback point 22. Thus, the output from the feedback point 22 is a velocity deviation, which is the difference between the target velocity and the actually moving velocity of the light spot.

Numeral 23 represents an open-loop gain, which is a block for determining an open-loop gain of the velocity servo loop. Numeral 25 is a torque constant of the actuator or linear motor 26, which indicates the sensitivity of the actuator. Numeral 26 denotes the actuator for moving the light spot, which is the same tracking actuator in the case of the apparatus in the single actuator arrangement and in the case of the track jump operation upon seeking to a near distance. If the apparatus has a linear motor for moving the optical head, the actuator 26 is the linear motor. Numeral 24 is a compensation gain, which is a block for compensating for a gain change due to the minor feedback, which is given for convenience sake of explanation, and which can be included in the open-loop gain 23. Further, numeral 27 denotes a velocity detection block for detecting the velocity of the actuator or linear motor, 28 denotes a phase compensation device for stabilizing the minor loop, 29 denotes a first-order differential block having a differential characteristic of order 1, and 30 denotes a gain block of the minor loop. Numeral 31 designates the minor feedback point, which is combined with the output of the compensation gain 27 and which supplies a drive signal to the actuator or linear motor 26. Practical apparatus need a driver circuit for driving the actuator 26, which is normally interposed between the minor feedback point 31 and the torque constant block 25, but it is omitted herein.

For applying the present invention to the velocity control system used in seek or track jump, the basic idea is the same as in the control systems of the previous embodiments. Since the transfer characteristics of the actuator are of a first-order lag system, the differential element 29 is arranged to have a first-order differential characteristic.

Figure 19:
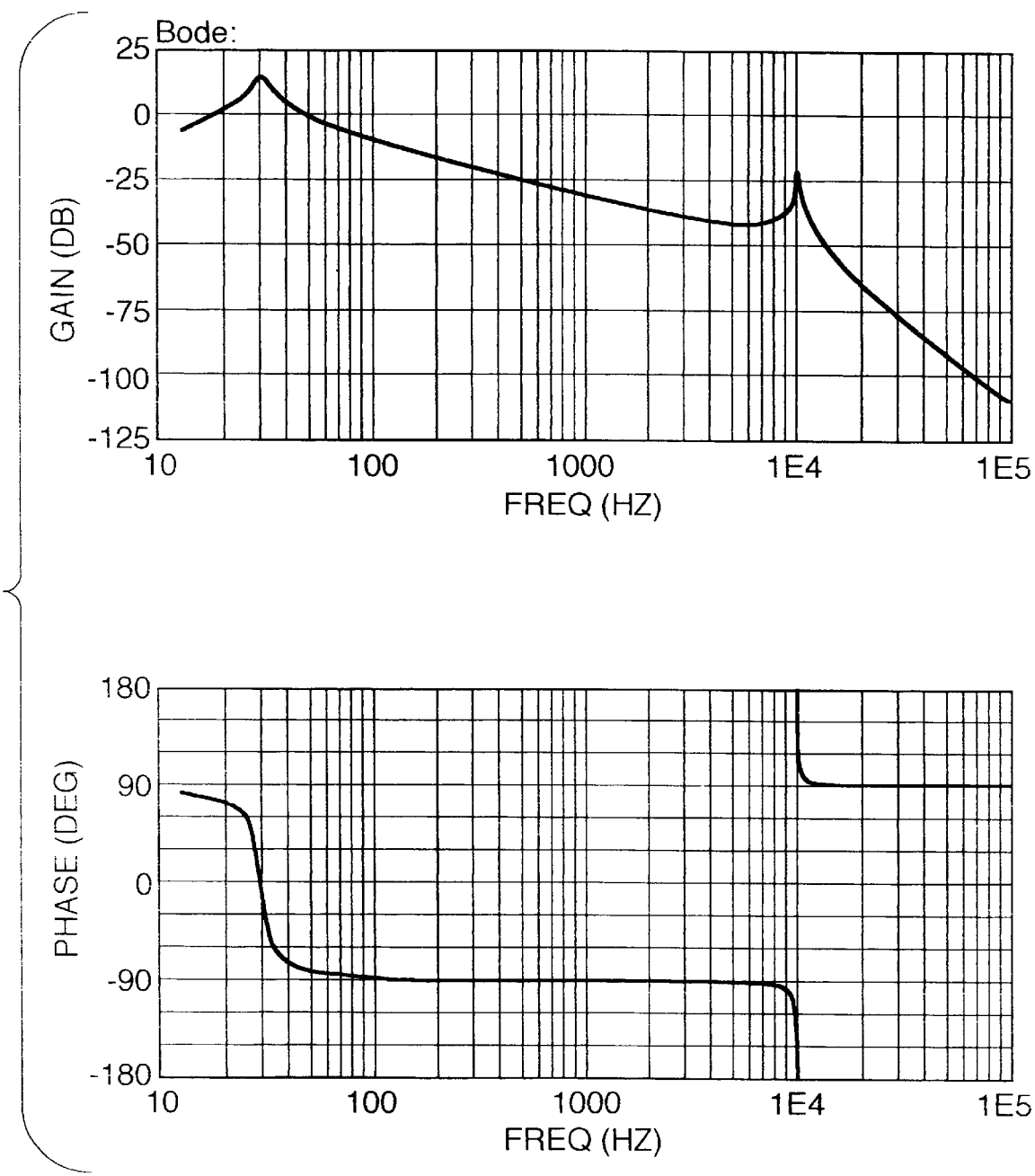
FIG. 19 shows the frequency characteristics of the seek actuator associated with the fourth embodiment of the present invention.
Figure 20:
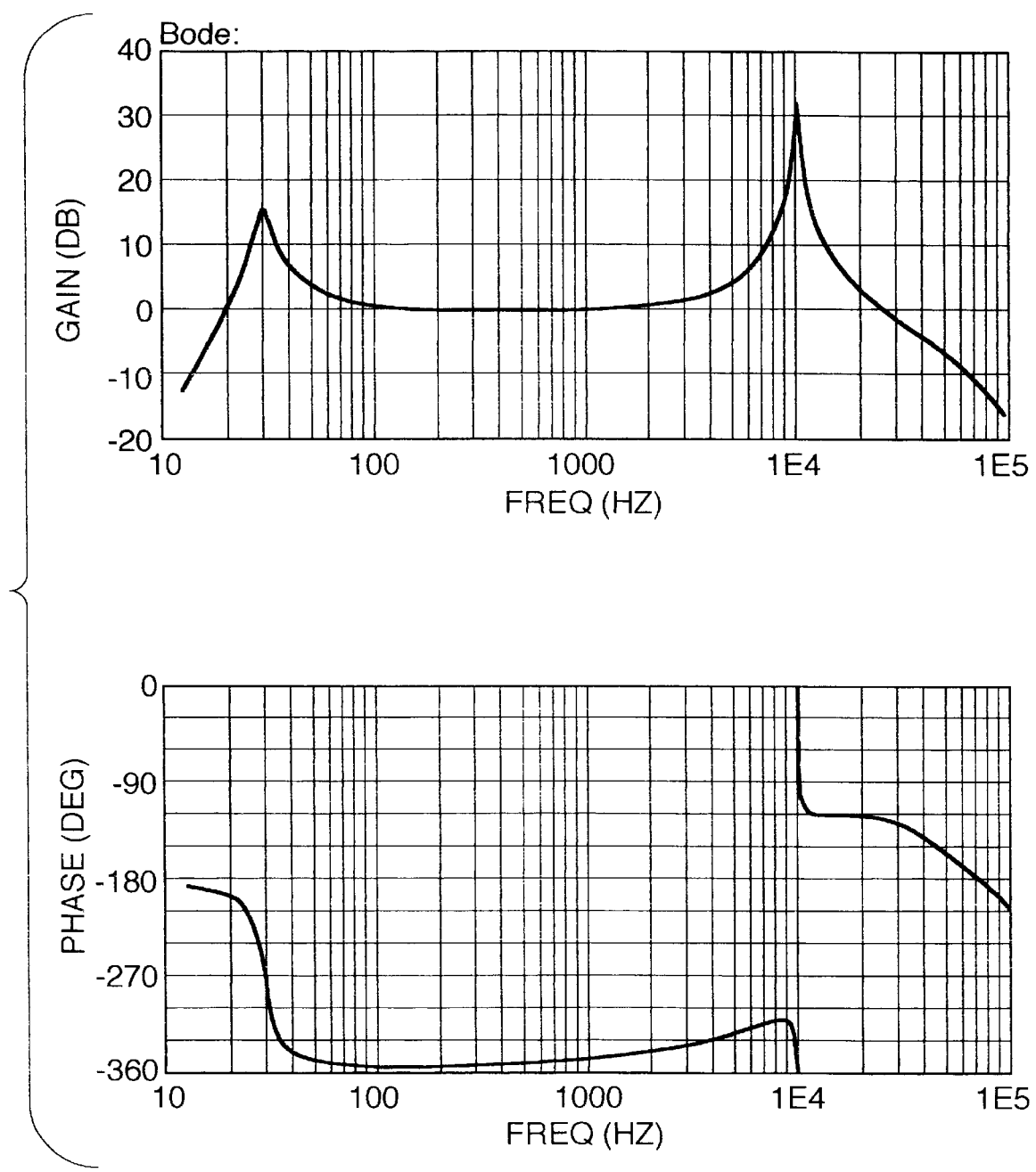
FIG. 20 shows the open-loop transfer characteristics of the minor loop associated with the fourth embodiment of the present invention.

Thus, only the point is explained as to the case where the present invention is applied to the velocity control system. FIG. 19 shows transfer characteristics of from the input of compensation gain 27 to the actuator velocity. As shown, there appears the secondary resonance at 10 kHz as in the previous embodiments. The characteristics are those when the position output of the characteristics of the actuator in the previous embodiment is dealt with as a velocity output. FIG. 20 shows open-loop transfer characteristics of the minor loop shown in FIG. 18. The minor loop compensation 28, the minor loop gain 30, and the compensation gain 27 can be determined based on the same design criteria as in the previous embodiments.

Figure 21:
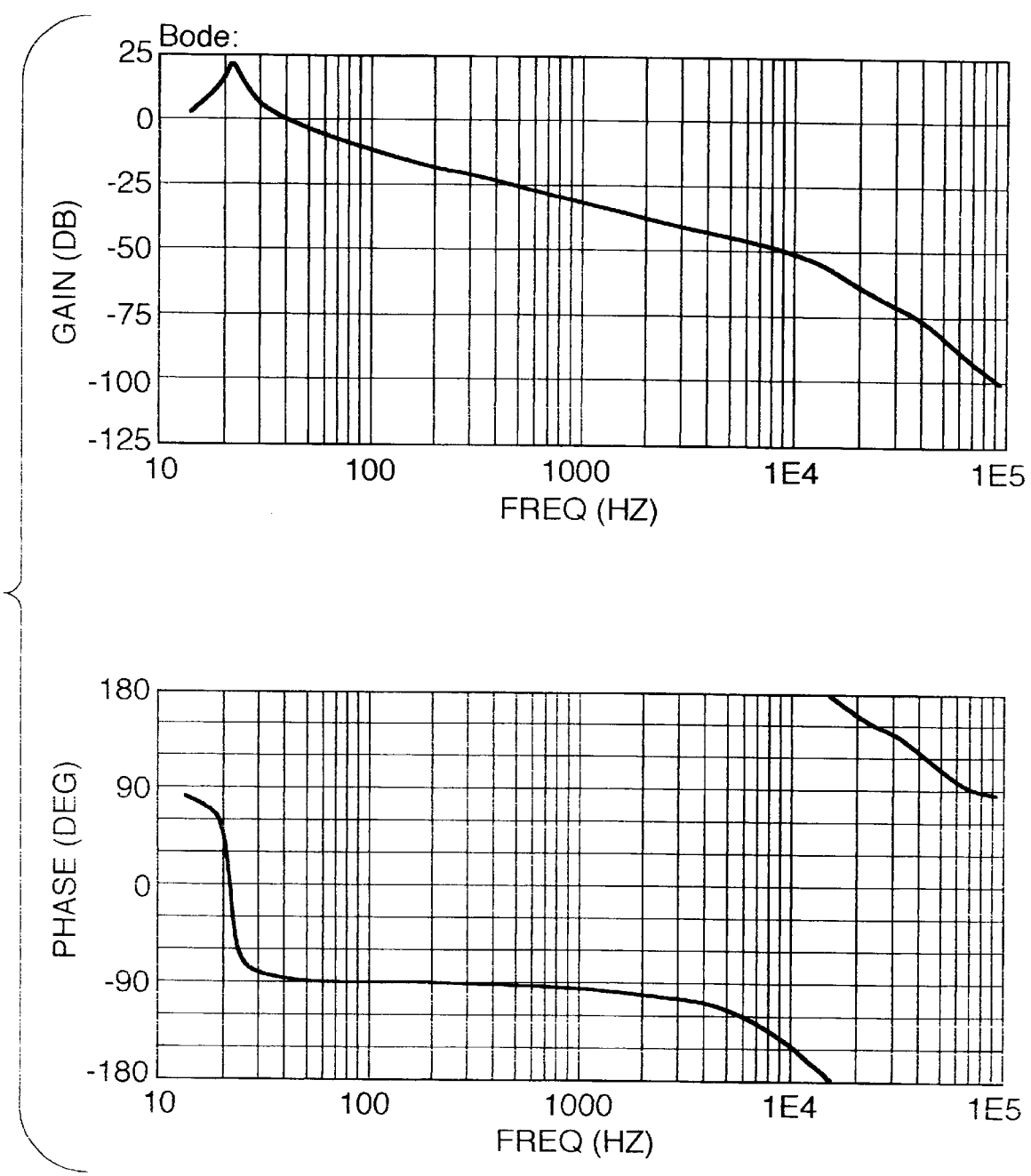
FIG. 21 shows the closed-loop transfer characteristics of the region around the minor loop associated with the fourth embodiment of the present invention.

FIG. 21 shows the transfer characteristics of from the input of compensation gain 27 to the actuator velocity when the minor loop is formed. As shown, the effect of secondary resonance can be decreased from the original degree of occurrence of secondary resonance of the actuator 26 as shown in FIG. 19 by setting the minor loop having the open-loop transfer characteristics shown in FIG. 20.

In this embodiment, the tracking error signal can be used in order to detect the velocity of the actuator or linear motor 26. The moving velocity of the actuator or linear motor 26 can be detected by binarizing a traverse waveform of the tracking error signal based on traverse of tracks during seek and counting them, or measuring binarized pulse intervals. In other cases, in order to raise the velocity detection accuracy and detection band, a differential signal of the tracking error signal or an observer can be used, thereby facilitating stabilization of the minor loop by an increase of the velocity detection band.

For an actuator having different secondary resonance characteristics, similar to the previous embodiments of the position control, the stable minor loop can be formed by properly setting the minor loop compensation 28 and the minor loop gain 30.

When the present invention is applied to the velocity control for seeking as in the present embodiment, the velocity control band or velocity control accuracy can be enhanced even for the actuator or linear motor with secondary resonance. This enables an increase in the acceleration of the profile given as the target velocity of seeking, thereby realizing high-speed seeking. The enhanced velocity control accuracy nullifies the velocity deviation on the target track immediately before the end of seeking, thus facilitating tracking pulling. Of course, the optical head can make sure access to the target track without overrun.

Use of the present invention permits actuators having low secondary resonance frequencies or actuators having a large peak of secondary resonance to be used, so that the invention permits cheap actuators with low rigidity or cheap actuators with low production accuracy to be used, thus providing a low-cost optical disk apparatus.

Further, the use of the present invention can decrease the dispersion in the sensitivity of the actuator, for example where moving amounts differ with a constant drive current. Even with some dispersion in the sensitivity of the actuator, the dispersion can be remarkably decreased by the effect of the minor loop. This is because the closed-loop transfer characteristics of the minor loop become closer to the inverse characteristics of the characteristics determined by the first-order differential characteristic and the minor loop gain interposed in the feedback loop. This effect can be enhanced by increasing the minor loop gain. This effect can also decrease the dispersion of the actuator, and in combination thereof with the secondary resonance restricting effect, the control band can be broadened. Since the dispersion in the sensitivity of the actuator is permissible, cheap actuators with low production accuracy can be used, thus enabling the providing of a low-cost optical disk apparatus.

Particularly, in the case of the apparatus for performing seeking by moving the optical head with the linear motor or the like (in the two-stage actuator arrangement), it is difficult to raise the secondary resonance frequency or to decrease the secondary resonance because of it structure, and thus, a great effect can be expected by applying the present invention thereto.

As detailed above, the present invention can decrease the negative effect of secondary resonance of the actuator in the optical disk apparatus, which enables the forming of a high-accuracy control system. This enables the providing of a large-capacity apparatus capable of performing high-speed seeking.

The present invention realizes the production of an apparatus using a cheap actuator with low rigidity or low assembling accuracy, and, therefore, it can provide an optical disk apparatus having a low-cost servo control system.

What is claimed is:

1. An optical information recording and/or reproducing apparatus for performing at least one of recording and reproduction of information by irradiating a recording medium with a light beam, comprising:

an actuator for moving the light beam relative to the medium;

a position detecting circuit for detecting a position of said actuator;

a circuit for generating a relative position error signal of said light beam with respect to said medium;

a control loop for controlling said actuator in accordance with said relative position error signal;

a filter for differentiating an output from said position detecting circuit, wherein said filter has a quadratic differential characteristic; and an adder for adding an output from said filter to a signal in said control loop.

2. The apparatus according to claim 1, wherein said control loop is a focusing control loop.

3. The apparatus according to claim 1, wherein said control loop is a tracking control loop.

4. The apparatus according to claim 1, wherein said position detecting circuit detects the position of said actuator, using said relative position error signal.

* * * * *

UNITED STATES PATENT AND TRADEMARK OFFICE
CERTIFICATE OF CORRECTION

PATENT NO.   : 5,875,162

DATED        : February 23, 1999

INVENTOR(S)  : HISATOSHI BABA

It is certified that error appears in the above-identified patent and that said Letters Patent is hereby corrected as shown below:

<u>COVER PAGE, AT [56], References Cited</u>
"5298724" should read --5-298724--.

<u>COLUMN 3</u>
Line 13, "handed" should read --handled--.

<u>COLUMN 8</u>
Line 1, delete "of".

<u>COLUMN 12</u>
Line 26, "it" should read --its--.

Signed and Sealed this

Thirty-first Day of August, 1999

Attest:

Q. TODD DICKINSON

*Attesting Officer*         *Acting Commissioner of Patents and Trademarks*